United States Patent
Kohtani et al.

(10) Patent No.: US 6,384,934 B1
(45) Date of Patent: May 7, 2002

(54) ADJUSTING IMAGE PROCESSING CONDITION

(75) Inventors: Hideto Kohtani, Hachiohji; Takashi Nonaka, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/031,894

(22) Filed: Feb. 27, 1998

(30) Foreign Application Priority Data

Feb. 28, 1997 (JP) .............................................. 9-046634
Feb. 28, 1997 (JP) .............................................. 9-046635

(51) Int. Cl.[7] .............................. H04N 1/58; H04N 1/50; G06K 15/02; G06F 3/12
(52) U.S. Cl. ....................... 358/1.9; 358/1.14; 358/1.15; 358/504; 358/518
(58) Field of Search ................................. 358/1.9, 1.14, 358/1.13, 1.16, 1.15, 501, 504, 401, 296, 300, 518, 540

(56) References Cited

U.S. PATENT DOCUMENTS

| | | | |
|---|---|---|---|
| 4,888,636 A | | 12/1989 | Abe |
| 4,943,936 A | * | 7/1990 | Hirai et al. ................. 358/1.18 |
| 5,050,098 A | * | 9/1991 | Brown et al. ............... 358/1.13 |
| 5,191,361 A | | 3/1993 | Abe |
| 5,258,783 A | | 11/1993 | Sasanuma et al. |
| 5,343,233 A | | 8/1994 | Abe |
| 5,572,330 A | | 11/1996 | Sasanuma |
| 5,579,090 A | | 11/1996 | Sasanuma et al. |
| 5,774,356 A | * | 6/1998 | Hisatake et al. ............ 358/401 |
| 5,918,988 A | * | 7/1999 | Van Oijen ................. 358/1.15 |

* cited by examiner

Primary Examiner—Scott Rogers
(74) Attorney, Agent, or Firm—Fitzpatrick, Cella, Harper & Scinto

(57) ABSTRACT

An image processing apparatus and method which has a function of adjusting an image processing condition, in accordance with a condition change caused by some reasons, such as time elapsing or circumstance change. According to one aspect, the image processing apparatus reads an original and generates first image data, receives second image data from an external apparatus, processes the first or the second image data for forming an image, judges the necessity of adjusting an image process condition of process means, and adjusts the image processing condition based on the judgement result. However, so as to avoid image differences caused if the adjustment process occurs during interruption of an image process job, in case the necessity of adjusting is judged during an image process job, adjusting means restrains the adjusting operation until the image process job is finished.

30 Claims, 32 Drawing Sheets

| NAME OF THE SIGNAL | SIMPLIFIED SIGN | DIRECTION OF THE SIGNAL |
|---|---|---|
| PRINTER POWER READY | / PPRDY | CONTROLLER ← PRINTER |
| CONTROLLER POWER READY | / CPRDY | CONTROLLER → PRINTER |
| READY | / RDY | CONTROLLER ← PRINTER |
| PRINT | / PRINT | CONTROLLER → PRINTER |
| TOP OF PAGE | / TOP | CONTROLLER ← PRINTER |
| LINE SYNCHRONIZATION | / LSYNC | CONTROLLER ← PRINTER |
| VIDEO CLOCK | / VCLK | CONTROLLER → PRINTER |
| IMAGE ENABLE | / VDOEN | CONTROLLER → PRINTER |
| IMAGE | / VDO | CONTROLLER → PRINTER |
| CONTROLLER CLOCK | / CCLK | CONTROLLER → PRINTER |
| COMMAND BUSY | / CBSY | CONTROLLER → PRINTER |
| COMMAND | / CMD | CONTROLLER → PRINTER |
| STATUS BUSY | / SBSY | CONTROLLER ← PRINTER |
| STATUS | / STS | CONTROLLER ← PRINTER |
| PRINTER POWER READY | / PFED | CONTROLLER ← PRINTER |
| SPEED CHANGE | / SPCHG | CONTROLLER ← PRINTER |
| PAPER DELIVERY | / PDLV | CONTROLLER ← PRINTER |
| PAPER TOP | / TOPR | CONTROLLER ← PRINTER |
| STATUS CHANGE NOTIFICATION | / CCRT | CONTROLLER ← PRINTER |

FIG.4

100 # ADJUSTING IMAGE PROCESSING CONDITION

BACKGROUND OF THE INVENTION

1. Field of the Invention

This invention relates to an image processing apparatus and method, which has a function of adjusting an image processing condition in accordance with a change in another condition, such as might be caused by passage of time or a change in circumstance.

2. Description of the Related Art

An image forming apparatus such as a printer engine, especially a printer engine for forming a color image, density or color balance of an output image will change gradually, such as after large quantities of image outputs or change in circumstance of the printer engine.

Conventional printer, therefore have a function of adjusting density of an output image automatically, by monitoring changes of output quantities or circumstance, as described in U.S. Pat. Nos. 4,888,636, 5,191,361, 5,343,233, 5,258,783, 5,572,330, 5,579,090.

However, according to this conventional technology, the densities before and after the adjustment of the image processing condition will be largely different each other. As a result, if the adjustment of the image processing condition is executed in the middle of a print job which outputs a plurality of recorded mediums, the densities of the first output and the last output in the same print job will be different each other. That is a big problem especially for a color printer engine.

The same kind of problem arises when a print job is interrupted by another print job. Interruptions are common in apparatuses which have the functions of both copying and printing.

SUMMARY OF THE INVENTION

It is an object of the present invention to improve density adjustment in an image processing apparatus and method, which has a function of adjusting an image processing condition in accordance with a change in another condition.

Especially, it is an object of the present invention to provide a high quality multifunction printer, which has both copying function and printing function. In one aspect, the present invention is an image processing apparatus which comprises: reading means for reading an original and generating first image data; receiving means for receiving second image data from an external apparatus; process means for processing the first or the second image data for forming an image; judging means for judging the necessity of adjusting an image process condition of the process means; and adjusting means for adjusting the image processing condition based on the judgement result of the judging means. In a case where the necessity of adjusting is judged during an image process job, the adjusting means restrains adjusting operation until the image process job is finished.

It is another object of the present invention to provide an improved control method of interruption process and density adjustment process. According to another aspect, the present invention is an image processing apparatus comprising: receiving means for receiving information concerning the necessity of adjusting an image process condition; and control means for controlling the adjustment of the image processing condition based on the information received by the receiving means. In a case where, the necessity of adjusting is judged during an image process job, the control means prohibits executing another image process job other than the image process job in progress before adjusting the image processing condition.

Further according to another aspect, the present invention is an image processing apparatus comprising: first receiving means for receiving information concerning the necessity of adjusting an image process condition of an image processing apparatus; second receiving means for receiving a plurality of image process job commands, at least one of which can interrupt another image process job command; and control means for controlling an image process sequence of the image processing apparatus, which includes adjusting operation of the image process condition and a plurality of image process jobs based on the image process job commands.

It is further object of the present invention to provide an improved adjusting method which considers a proceeding of an image process job. In one aspect, the present invention is an image processing apparatus comprising: receiving means for receiving information concerning the necessity of adjusting an image process condition of an image processing apparatus; monitoring means for monitoring a proceeding of an image process job; and control means for controlling the adjustment of the image processing condition based on the information received by the receiving means and the proceeding of the image process job.

This summary has been provided so that the nature of the invention may be understood quickly. A more complete understanding of the invention can be obtained by reference to the followed detailed description of the preferred embodiments thereof in connection with the attached Figures.

BRIEF DESCRIPTION OF THE DRAWINGS

FIGS. 4 and 5 provide a detail explanation of the video interface signal.

DETAILED DESCRIPTION OF THE PREFERRED EMBODIMENT (First Embodiment)

According to this embodiment, if the adjustment of the image processing condition becomes necessary during a print job, the adjustment is executed after finishing the print job. Further if the print job is a job which has interrupted another print job, the adjustment is postponed until the print job, which has been interrupted, is finished. For example, if a first job is interrupted by a second job and the necessity for the density control is judged during the second job, the adjustment is postponed until both the first and the second jobs are finished.

Figure 1:
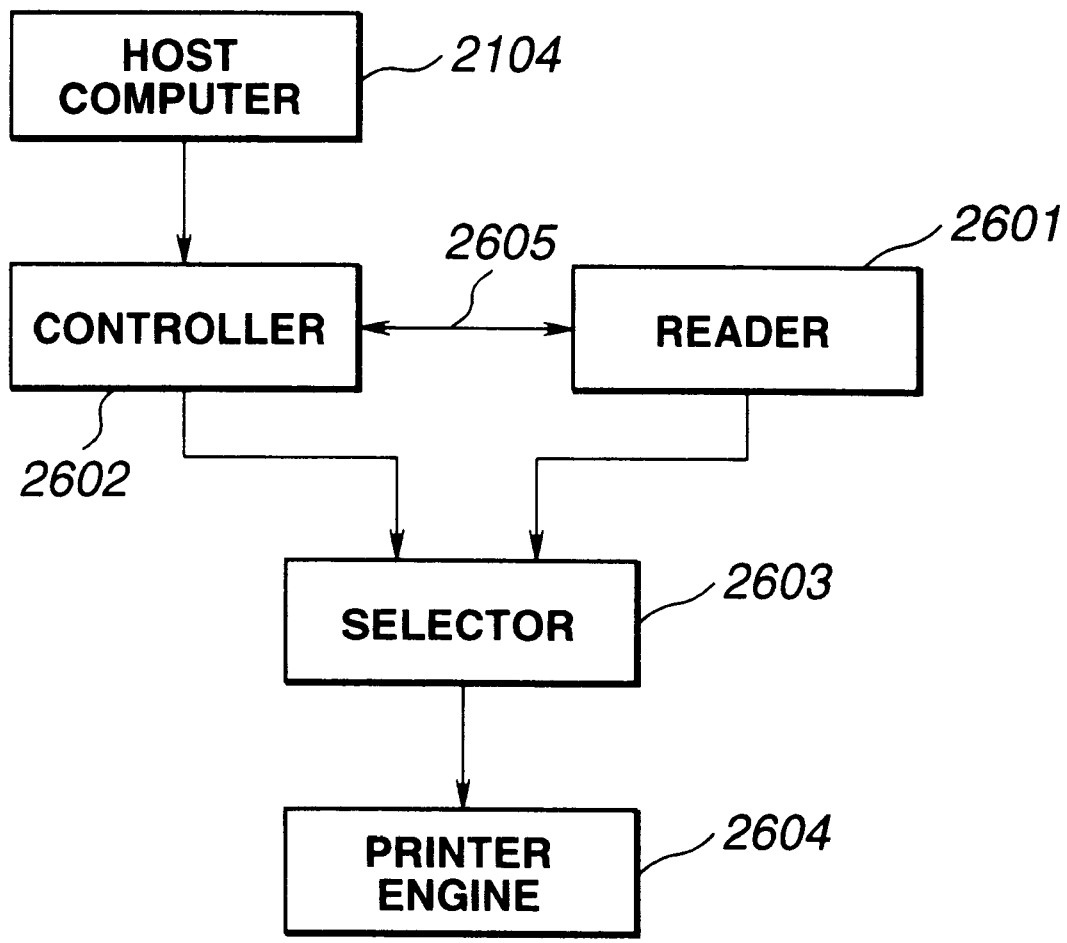
FIG. 1 shows a block diagram of an image forming system including an image processing apparatus according to one embodiment of the present invention.

FIG. 1 shows an example of the structure of an image forming system including an image processing apparatus according to this embodiment.

The image forming system shown in FIG. 1 comprises image reader 2601 for reading an original image, controller 2602 for communicating with image reader 2601 by communication line 2605, selector 2603 for selecting one of the outputs of reader 2601 and controller 2602, and printer engine 2604 for forming an image based on the output of selector 2603.

According to this system, it is possible to form an image by printer engine 2604, by interrupting the print job commanded by host computer 2104 and the print job commanded by image reader 2601 each other. Controller 2602 controls the above image forming including interruption processing.

In a case where the print job commanded by host computer 2104 interrupts the print job commanded by image reader 2601 or the print job commanded by image reader 2601 interrupts the print job commanded by host computer 2104, and density adjustment becomes necessary during the print job, it is not enough only to postpone the adjustment until the print job, which is going on, is finished. Even if the adjustment is postponed until the print job which has interrupted another print job is finished, the densities of images of the print job, which has been interrupted, will be changed in the middle of the print job.

Therefore, according to this embodiment, in the image forming system shown in FIG. 1, if the adjustment of the image processing condition becomes necessary during a print job, the adjustment is executed after both of the print jobs, that is, the job which has interrupted another print job and the job which has been interrupted by another print job, are finished.

Figure 2A:
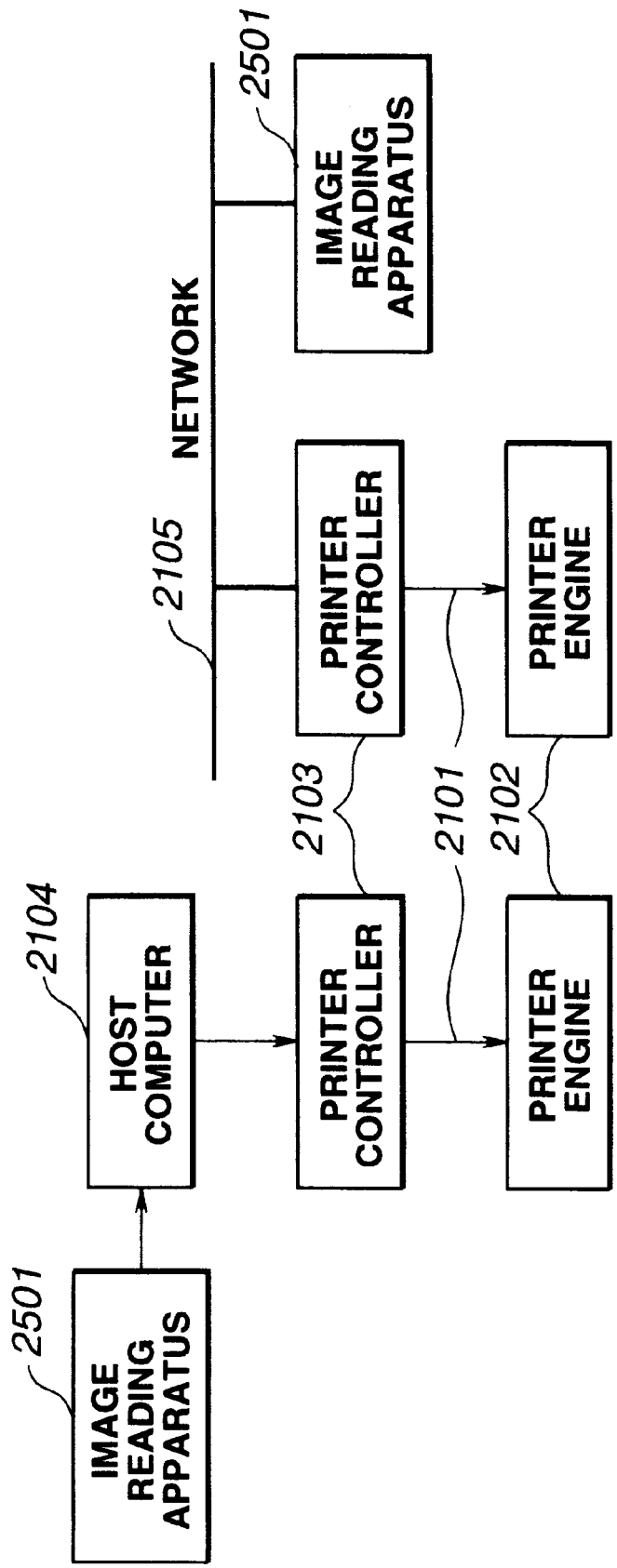
FIG. 2A shows a block diagram of the structure of an image forming system according to another embodiment of the present invention.

FIG. 2A is a block diagram, which shows an example of the structure of the image forming system according to this embodiment.

In this figure, image reading apparatus 2501, which is connected to network 2105 or host computer 2104, reads an original image and outputs digital image data of the original image. The image data output from image reading apparatus 2501 is sent to printer controller 2103 through network 2105 or host computer 2104 and used for forming output image on a medium by printer engine 2102.

Figure 2B:
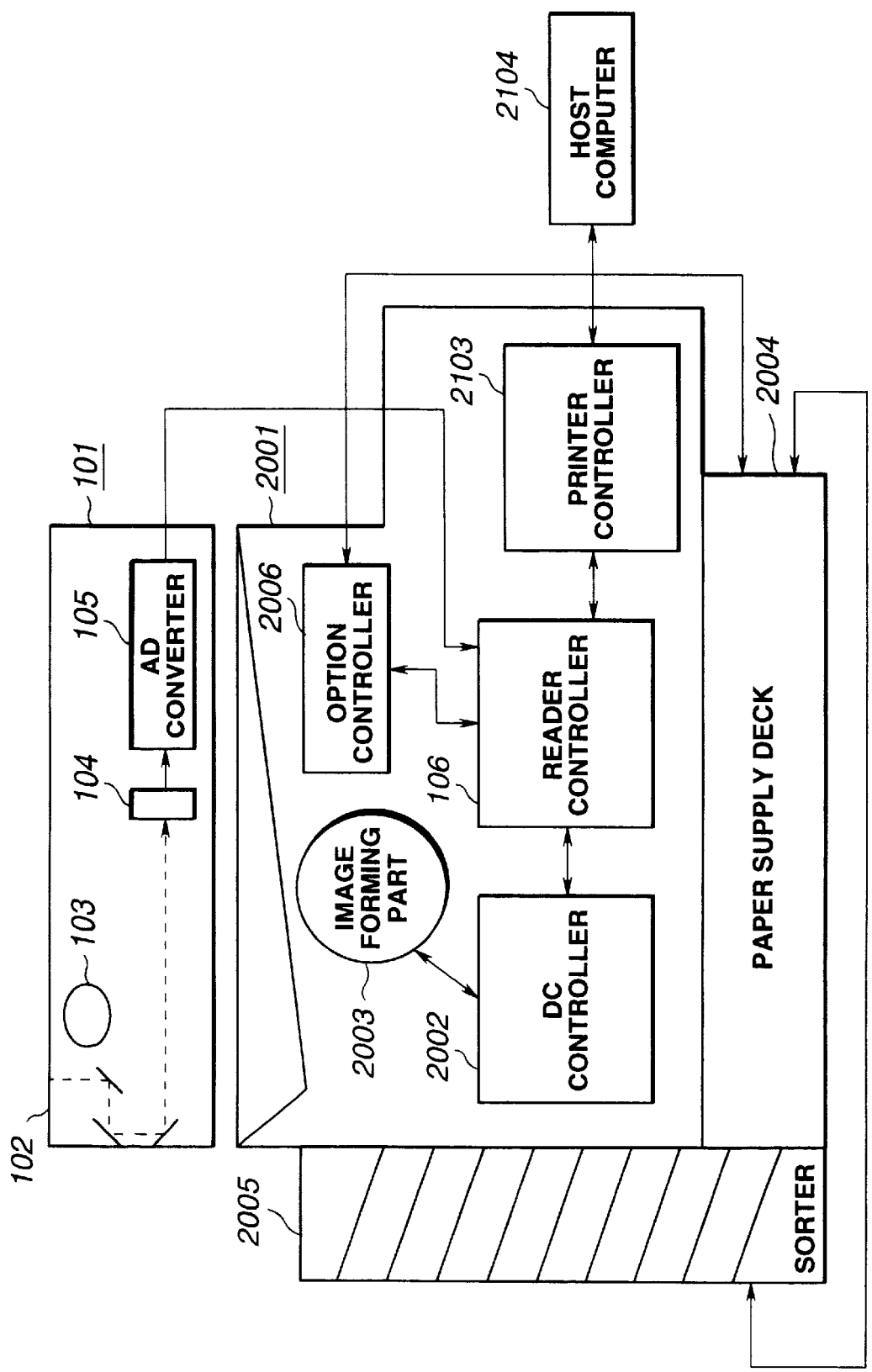
FIG. 2B is a view for explaining an image processing apparatus according to one embodiment of the present invention.

FIG. 2B is a general view of the image processing apparatus of this embodiment.

In this figure, 101 is a reader apparatus, 2001 is a printer apparatus and 2104 is a host computer.

Reader apparatus 101 comprises original image supporting plate 102, light source 103, photoelectric conversion part 104 and analogue/digital (A/D) converter 105. An original image on original image supporting plate 102 is illuminated by the light from light source 103. The reflected light from the original image is lead to photoelectric conversion part 104 and converted to digital image data. The digital image data is supplied to reader controller 106. The operation of reader apparatus 101 is controlled by reader controller 106.

Printer apparatus 2001 comprises reader controller 106, DC controller (engine controller) for controlling transmission of recording medium and image forming, image forming part 2003, option controller 2004, printer controller 2103.

Optional paper supply deck 2004 and sorter 2005 can be connected to printer apparatus 2001. The operations of those optional apparatus are controlled by option controller 2006.

Reader controller 106 controls image processing of the digital image data supplied by A/D converter 105, performs a motor control for scanning an original image by reader apparatus 101, and communicates with DC controller 2002, printer controller 2103 and option controller 2006.

According to this embodiment, it is not necessary to provide a separate cable for communication with printer controller 2103 and option controller 2006 from of printer apparatus 2001, because reader controller 106 is arranged not in reader apparatus, but in printer apparatus 2001.

Each of the above mentioned controllers comprises a CPU, ROM which stores control program and image process program, and RAM which is used by the CPU for work memory.

Printer controller 2103 and reader controller 106 further comprise an image processor for several kinds of image processing and image memories.

According to this embodiment, reader controller 106 is connected between the printer engine, which comprises DC controller 2002, image forming part 2003 and option controller 2006, and printer controller 2103. The process is performed between printer controller 2103 and printer engine. The connection between printer controller 2103 and printer engine will be explained as follows.

Figure 3A:
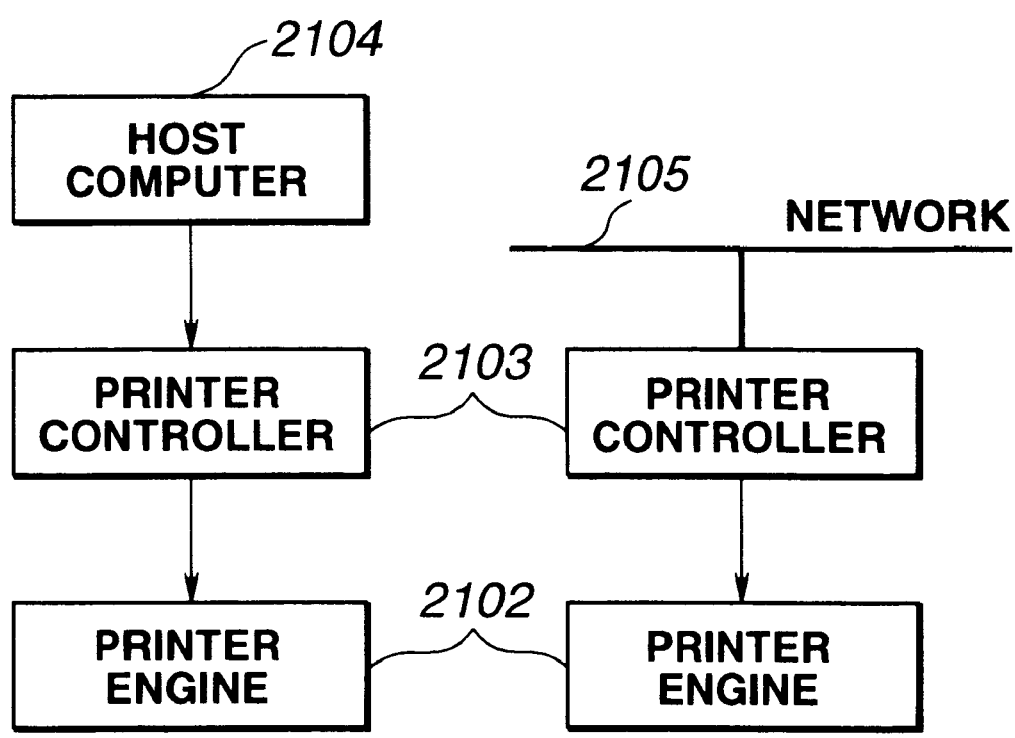
FIG. 3A is a block diagram for explaining the connection between a printer controller and a printer engine.

FIG. 3A is a block diagram for explaining the connection between printer controller 2103 and the printer engine. Printer controller 2103 is connected directly or through network 2105 to host computer 2104 and receives various kinds of image data including image data described by page description language (called PDL data in the following passages).

When printer controller 2007 receives PDL data, it develops the PDL data into raster image data by raster image processing (RIP).

Printer controller 2103 converts the received image data into video signal for printing and sends it to printer engine 2102 through video interface 2101 in synchronism with the operation of printer engine 2102. Details of video interface 2101 will be explained later.

Printer engine 2102 forms a toner image on a recording medium based on the received video signal, fixes the toner image and outputs the recording medium on which visible image is formed. In order to realize the successive image forming sequence, printer engine 2102 controls laser driver, laser scanner, photosensitive dram and fixing device(not shown in Figures) of image forming part 2003, detects a condition of each part of the printer, and notifies the detection results to printer controller 2103.

Figure 3B:
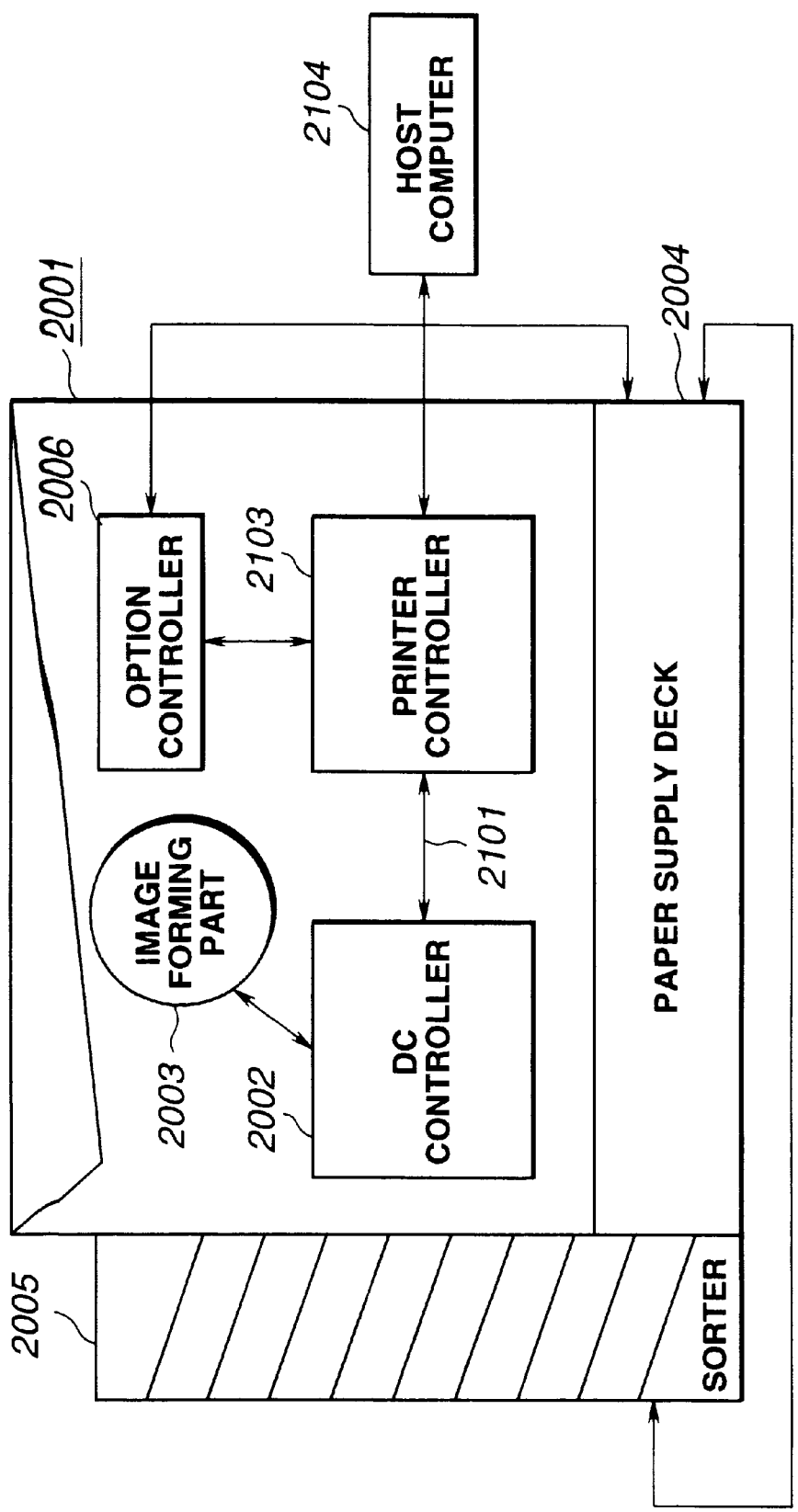
FIG. 3B is a general view of a printer having a printer controller and a printer engine.

FIG. 3B shows a general view of the printer which has above mentioned printer controller 2103 and printer engine 2102.

Printer engine 2102 comprises DC controller 2002 for controlling transmission of recording mediums and image forming and image forming part 2003. If optional paper deck 2004 or sorter 2005 is provided, printer engine 2102 includes option controller 2006 for controlling those optional apparatus.

Figure 5:
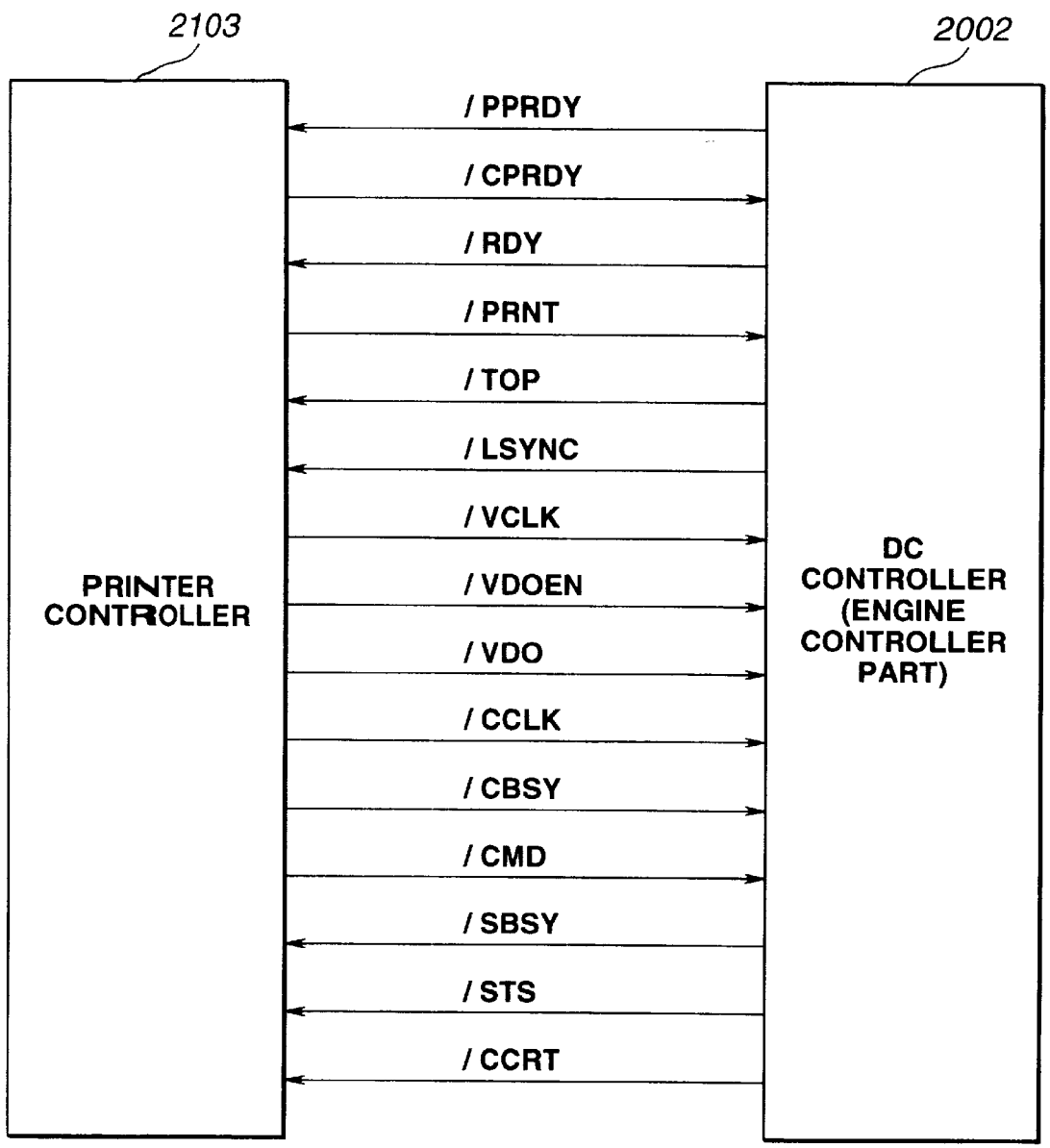

FIGS. 4 and 5 show video interface signals in detail, with FIG. 5 showing the typical signals between printer controller 2103 and DC controller 2002.

The mark '/' before a signal name indicates that the signal is a negative logic signal and are explained as follows:

(a) Printer power ready signal /PPRDY: This signal indicates that the communication function of DC controller 2002 becomes available after the power has been supplied to printer apparatus 2001 and initialization process has been finished. This signal is sent from DC controller 2002 to printer controller 2103.

(b) Controller power ready signal /CPRDY: This signal indicates that the communication function of printer controller 2103 becomes available after the power has been supplied to printer controller 2103 and initialization process has been finished. This signal is sent from printer controller 2103 to DC controller 2002.

(c) Ready signal /RDY: This signal indicates that the printing operation becomes available in response to /PRNT (mentioned later) for requesting print start. This signal is sent from DC controller 2002 to printer controller 2103. The signal becomes true when the operation of each part of the printer has been correct, for example, the temperature of the fixing device has reached a predetermined level, no recording medium has been remaining in the printer, and polygon mirror has been rotating at a predetermined speed.

(d) Print signal /PRNT: This signal indicates starting or continuing of the printing operation. This signal is sent from printer controller 2103 to DC controller 2002.

(e) Top of page signal /TOP: This signal is a synchronization signal for the standard of vertical scanning direction and is output from DC controller 2002 in a predetermined time after printer controller 2103 outputs /PRNT.

(f) Line synchronization signal /LSYNC: This signal is a synchronization signal for the standard of horizontal scanning direction and is output from DC controller 2002 in a predetermined time after printer controller 2103 outputs the signal /PRNT.

(g) Video clock signal /VCLK: This signal is a synchronization clock for the signals /VDOEN and /VDO and is output from printer controller 2103.

(h) Image enable signal /VDOEN: This is a signal for supplying the image signal /VDO output from printer controller 2103 to DC controller 2002. DC controller 2002 discriminates whether /VDOEN is true or false in synchronism with the signal /VCLK. If /VDOEN is true, the image signal /VDO is supplied while it is false, the signal is not supplied.

(i) Image signal /VDO: This signal is image data output from printer controller 2103 in synchronism with /VCLK by using /TOP as a standard of vertical direction and /LSYNC as a standard of horizontal direction.

(j) Controller clock signal /CCLK: This signal is a synchronization signal for a command which is serially transferred from printer controller 2103 to DC controller 2002 and a status which is transferred from DC controller 2002 to printer controller 2103. This signal is output from printer controller 2103.

(k) Command signal /CMD: This signal is used by printer controller 2103 for serially transmitting information to DC controller 2002 and is called command.

(l) Command busy signal /CBSY: This signal shows to DC controller 2002 that printer controller 2103 is serially transmitting a command by using /CMD.

(m) Status signal /STS: This signal is used when information is serially transmitted to printer controller 2103 by DC controller 2002. This information is called status.

(n) Status busy /SBSY: This signal shows to printer controller 2103 that DC controller 2002 is serially transmitting a status by using /STS.

(o) Status change notification /CCRT: This signal is a signal for notifying the status change in the printer to printer controller 2103. After receiving this signal, printer controller 2103 generates a command for requesting which status has changed in the printer engine 2102 by using /CMD. In response to /CMD, DC controller 2002 answers by using /STS.

Figure 6:
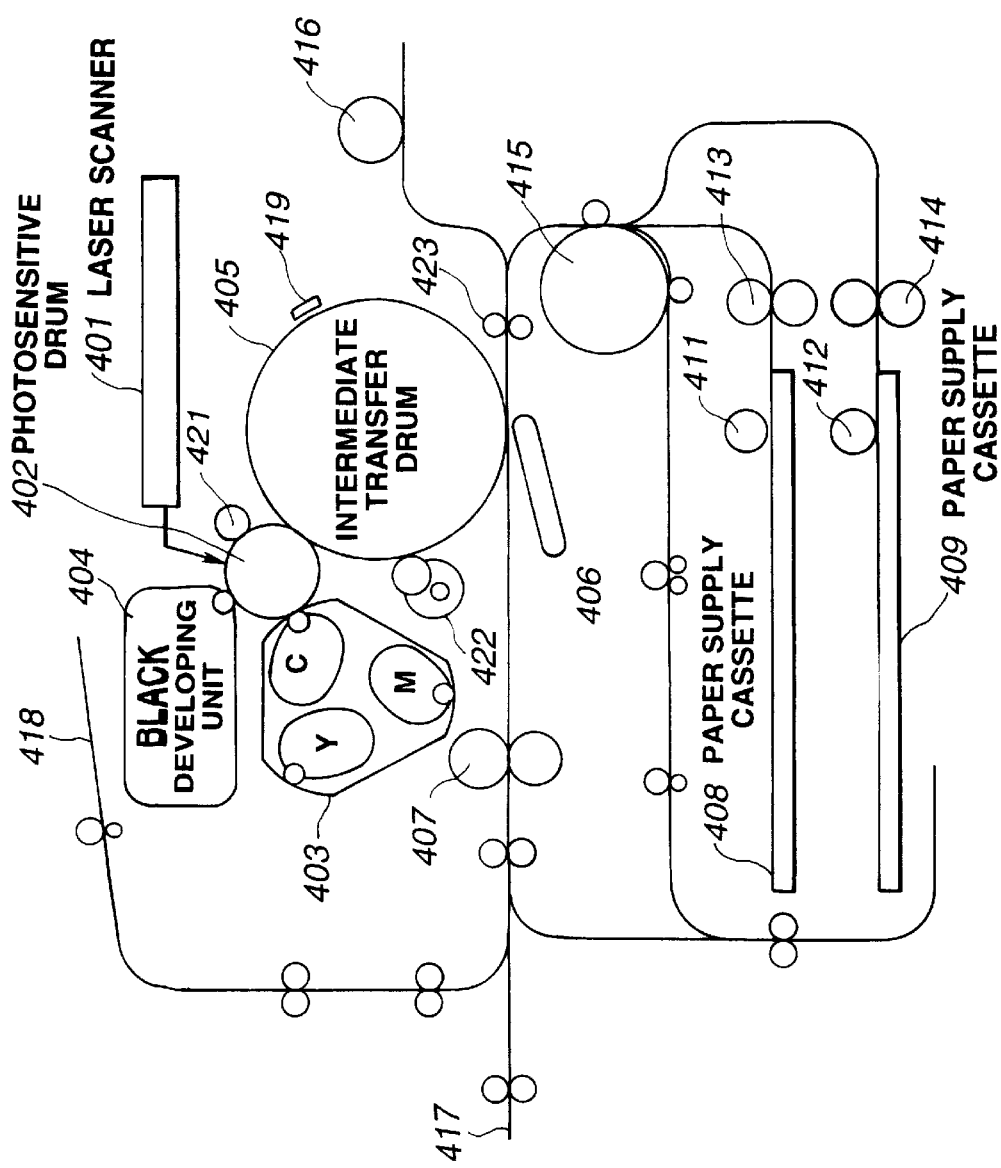
FIG. 6 explains an image forming part of a printer engine.

FIG. 6 explains the structure of image forming part 2003.

In FIG. 6, laser scanner 401 generates laser light which is controlled, such as on/off, based on /VDO from printer controller 2103. The face of photosensitive drum 402, which rotates counterclockwise, is charged to a predetermined level by charger 421. A latent image is formed on the surface of photosensitive drum 402 by the laser light generated by laser scanner 401. Color developers 403 and black developer 404 develop a toner image by supplying, to photosensitive drum 402, toner according to the charged level of photosensitive drum 402. Only black developer 404 is used when a black-and-white image is formed, while both color developers 403 and black developer 404 are used when a color image of four color-toners is formed.

Next, the toner image formed on photosensitive drum 402 is transferred to intermediate transfer drum 405, which rotates clockwise. After intermediate transfer drum 405 rotates one time (to form a black-and-white image) or four times (to form a color image), transfer of the toner image to intermediate transfer drum 405 is finished.

Meanwhile, a recording medium, which is. supplied from upper cassette 408 by pickup roller 411 or lower cassette 409 by pick up roller 412, is transmitted by roller 413 or 414 and transmission roller 415 to just before registration roller 423. Then, at the.timing of finishing the transfer to intermediate transfer drum 405, the recording medium is sent to between intermediate transfer drum 405 and transfer belt 406 while transfer belt 406 is moved to the side of intermediate transfer drum 405 so that they hold the recording medium between them. As a result, the toner image on the intermediate transfer drum 405 is transferred to the recording medium.

The recording medium, on which the toner image is transferred, is sent to fixing roller 407, heated, pressured and the toner image is fixed to the recording medium. The recording medium, on which the toner image is fixed, is transmitted to face-up outlet 417 or face-down outlet 418 which is predetermined by printer controller 2103 and discharged.

Figure 7:
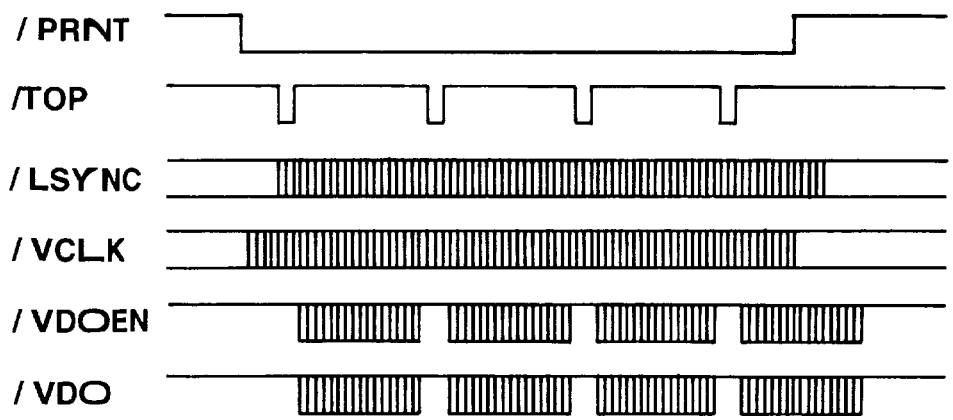
FIG. 7 shows an example of timing of signals between video interfaces.

FIG. 7 shows an example of signal timing in the video interface. In this figure, the above mentioned signals in the video interface are shown according to elapsed time.

First, printer controller 2103 notifies that the preparation of image data is finished to DC controller 2002 by making /PRNT true, and at the same time, generate /VCLK for transmitting /VDO. When /PRNT becomes true, DC controller 2002 performs various internal setting of the printer and outputs /TOP and /LSYNC signals after /VDO can be received. Printer controller 2103 outputs /VDO and /VDOEN in synchronism with /TOP and /LSYNC.

Next, the procedure of sending/receiving the commands and status during the printing operation will be explained.

The case without using /CCRT will be explained as follows in connection with FIG. 7.

When printer controller 2103 wants to generate a command for DC controller 2002, it makes /CBSY true, and sends the command by /CMD in synchronism with /CCLK. After receiving the command and waiting until /CBSY becomes false, DC controller 2002 makes /SBSY true and sends the printer status concerning the received command to printer controller 2103 by /STS in synchronism with /CCLK. Printer controller 2103 receives the status and controls the continuation or interruption of printing in accordance with the condition shown by the received status.

/CCRT becomes true when the condition, which is predetermined by printer controller 2103, is changed.

Figure 8:
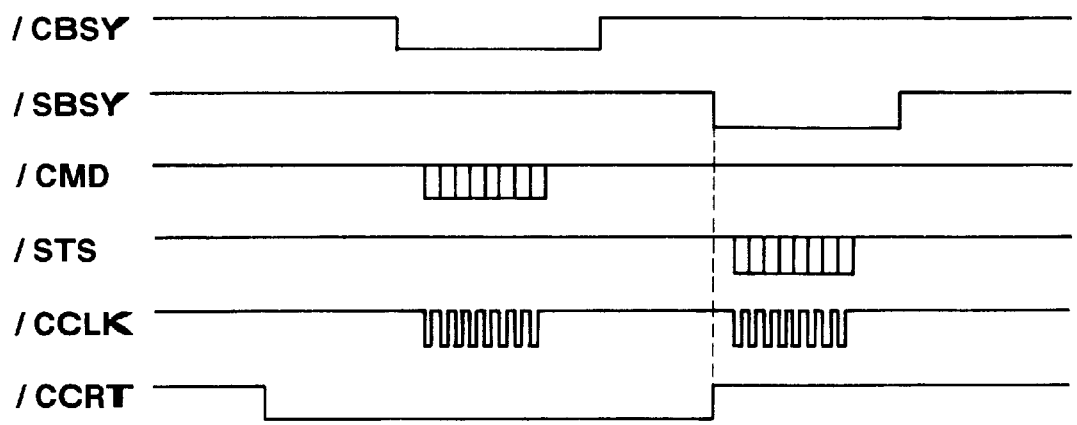
FIG. 8 shows an example of timing of signals in case /CCRT is used.

FIG. 8 shows an example of signal timing of in the video interface in case /CCRT is used. For example, the figure shows the case of setting /CCRT true when no paper is detected by /CMD from printer controller 2103. In this case, for example, if there is only one recording paper in the recording paper cassette while printer controller 2103 requests printing of two recording papers, a first image is correctly printed on the recording paper but when a second image is going to be printed, DC controller 2002 detects the status change, "no paper", and changes /CCRT to true from false, as shown in FIG. 8.

Just after printer controller 2103 detects that /CCRT has become true, printer controller 2103 sends, using /CMD, a command for requesting a status indicating the existence of recording paper in the paper cassette to DC controller 2002 by making /CBSY true, as shown in FIG. 8, in order to know which paper supply cassette is empty.

According to this command, DC controller 2002 makes /SBSY true, and returns, by using /STS, status which indicates the existence of recording papers of each recording paper cassette.

/CCRT is cleared and set false at the timing that /SBSY, which shows transmission of status, becomes true.

Figure 9:
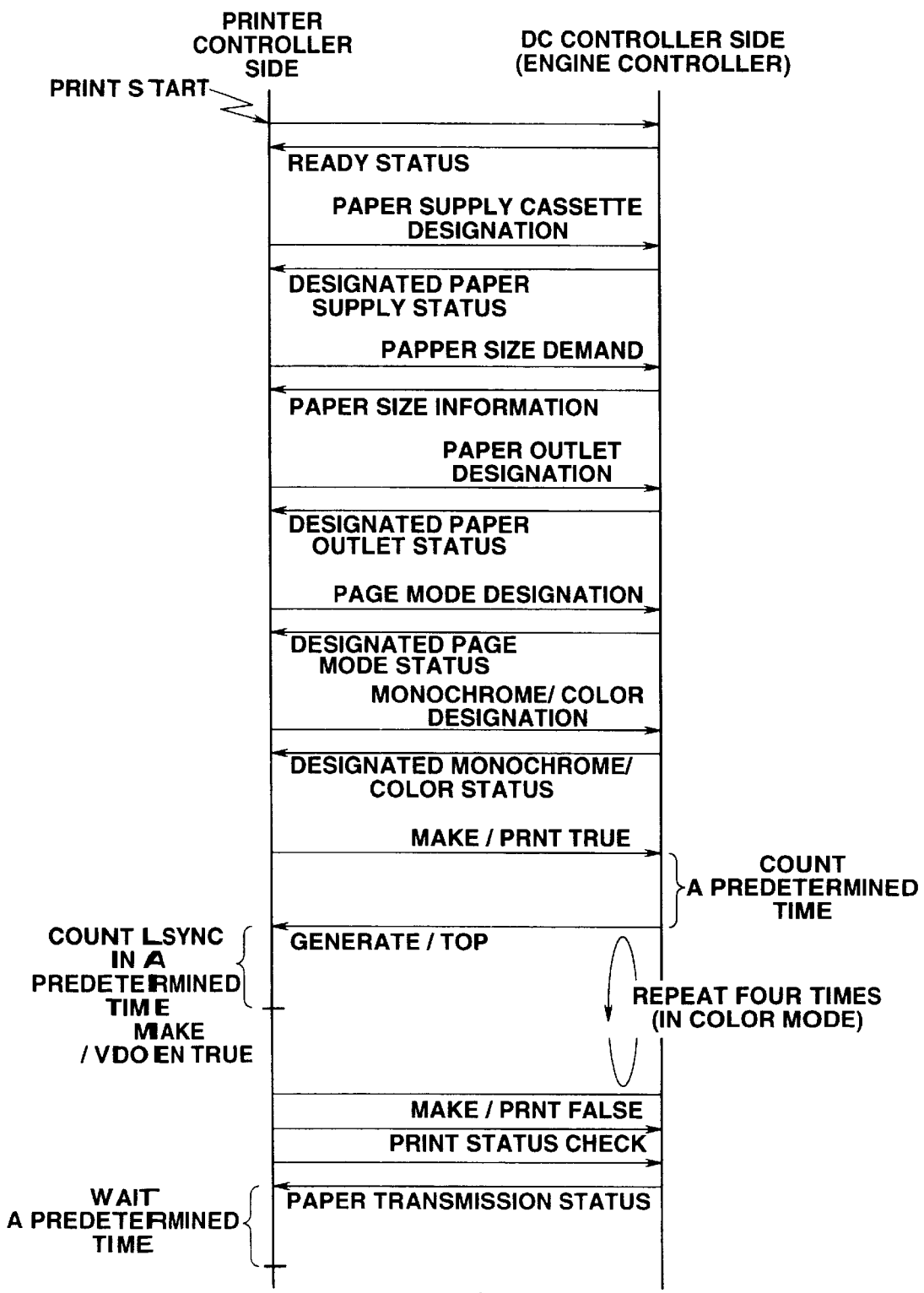
FIG. 9 shows an example of a sequence of commands/status between a printer controller and a DC controller.

FIG. 9 shows an example of command/status transmission sequence between printer controller 2103 and DC controller 2002, in a case of color image formation.

When printing is requested, printer controller 2103 performs image processing and sends a command to DC controller 2002 to check the ready status of the printer.

Next, printer controller generates a command for designating a paper supply cassette, and also a command for requesting the size of recording papers in the designated paper supply cassette.

Next, printer controller 2103 generates a command for designating the outlet of recorded papers, a page mode designation command for designating the number of pages to be formed, and a command for designating monochromatic/color image forming. After that the designations are finished.

DC controller 2002 returns the status concerning the sequence of these commands.

After that printer controller 2103 generates /PRNT, and in response to this signal, DC controller 2002 returns /TOP in a predetermined time.

Printer controller 2103 transmits /VDO synchronized with /VCLK to DC controller 2002. The vertical scanning of /VDO is synchronized with /TOP and the horizontal scanning of /VDO is synchronized with /LSYNC.

When a color mode is set, /TOP, which indicates the starting of each color component image, is generated four times and four color component images of respective YMCK colored toners are formed.

After the last /TOP is generated, printer controller 2103 returns /PRNT to false.

DC controller 2002 detects the finish of print request by /PRNT, and transits to the post-processing, such as cleaning of intermediate transfer drum 405 by cleaner 422. On the other hand, recording paper on which toner image is transferred is output from the designated outlet after passing fixing roller 407.

Finally, printer controller 2103 confirms that transmission (discharge) of the recording paper is finished by the status from DC controller 2002.

After printer controller 2103 confirms that the discharge is finished, end of the print job is confirmed, and printer controller 2103 waits for next print request with a ready status.

In case of abnormal status in a printer, such as jam of recording paper, no paper, an apparatus door open by a user, during above-mentioned printing operations, the fact is immediately transmitted from DC controller 2002 to printer controller 2103 by /CCRT. Printer controller 2103 realizes the abnormal status by a status returned in response to a command, and performs processing according to the abnormal status.

Figure 10:
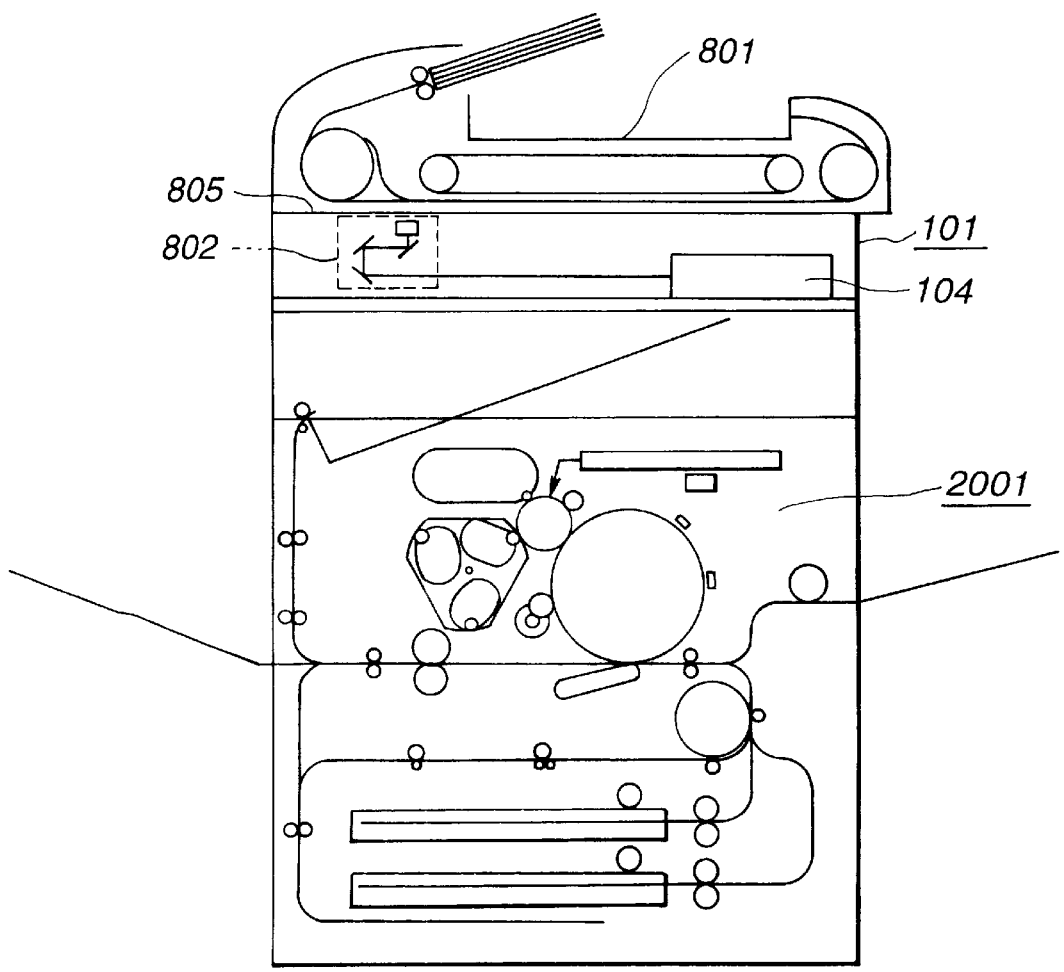
FIG. 10 shows a general view of a structure of printer shown in FIG. 3B, to which a reader apparatus is added.

FIG. 10 is an overview drawing of a system with the printer shown in FIG. 3B and a reader apparatus.

According to this construction, it is possible not only to output (print) an image based on image data sent from a computer, but also output (copy) an image based on digital image data obtained by optically reading an original image.

In FIG. 10 an original, which is put on original supplying apparatus 801 of reader apparatus 101, is transmitted to original supporting glass 805 in synchronism with the operation of optical reading part 802. Optical reading part 802 scans the original image in reciprocal right and left directions in the figure. The reflected light from the original image reaches photo-electronic conversion part 104 through an optical process.

Figure 11:
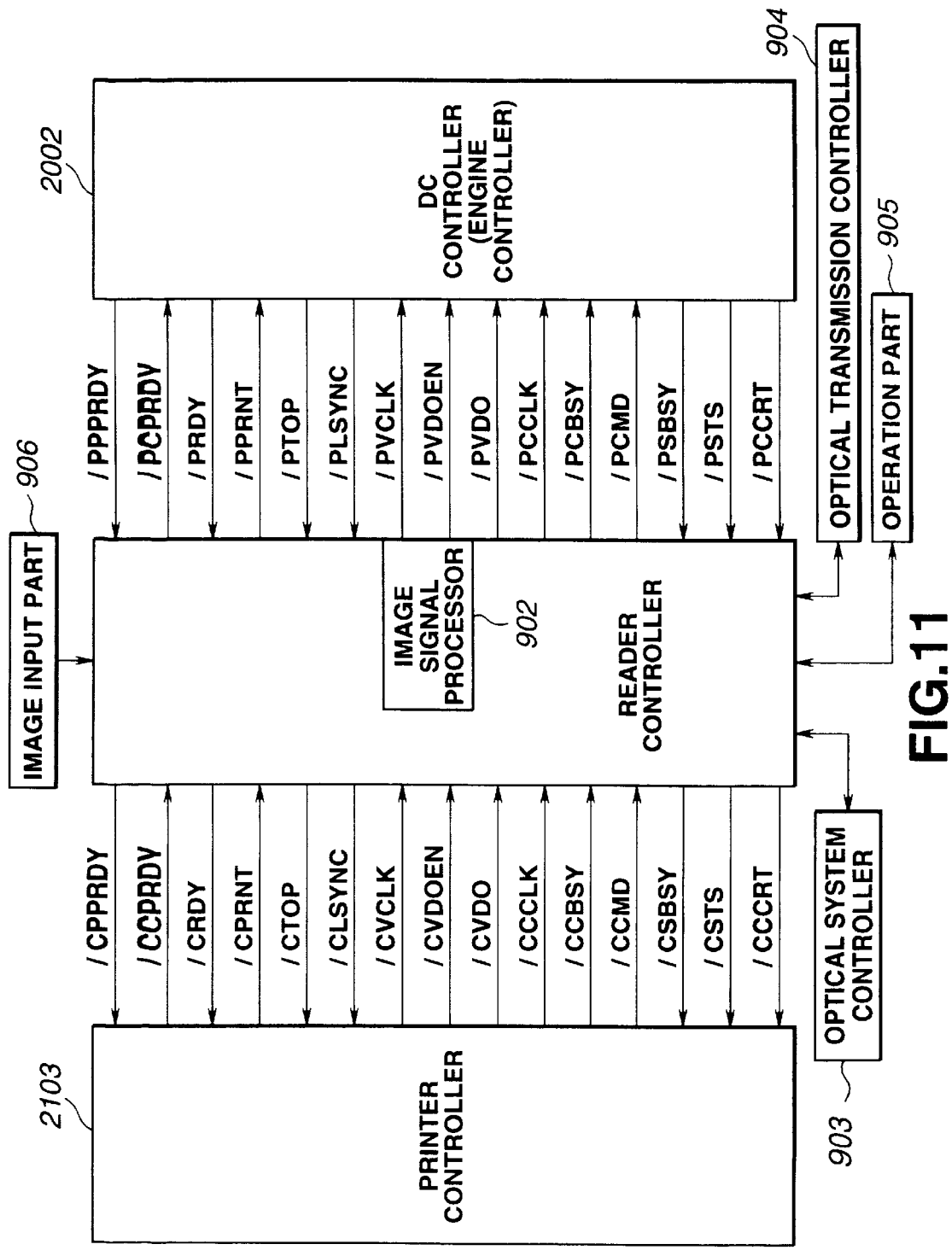
FIG. 11 shows a detail explanation of the video interface signal in case a reader controller is provided.

FIG. 11 shows the detail of the video interface signal, in a case where the system includes reader controller 106. FIG. 11 includes typical signals transmitted among printer controller 2103, reader controller 106, and DC controller 2002. Reader controller 106 is in the middle of the signal path between printer controller 2103 and DC controller 2002. The signal between printer controller 2103 and reader controller 106, and the signal between DC controller 2002 and reader controller 106, are the same signals as the signals shown in FIGS. 4, 5. Here, the former signal is designated with a "C" at the beginning of the signal name, and the latter signal is designated with a "P" at the beginning of the signal name in order to discriminate the signal between printer controller 2103 and reader controller 106 and the signal between DC controller 2002 and reader controller 106.

Reader controller 106 comprises image signal processing part 902 for processing the image signal input from reader apparatus 101 through image input part 906. Reader controller 106 is connected to optical system controlling part 903, in reader apparatus 101, which controls an optical system for scanning an original image. Reader controller 106 is also connected to transmission controlling part 904, in original supplying apparatus 801, which controls transmission of an original image. Further a display such as a CRT or LCD, for displaying operations and status of whole apparatus, as well as an operational panel which includes a key board for inputting the instructions by an user and a touch panel, are connected to reader controller 106 as operation part 905.

Figure 12:
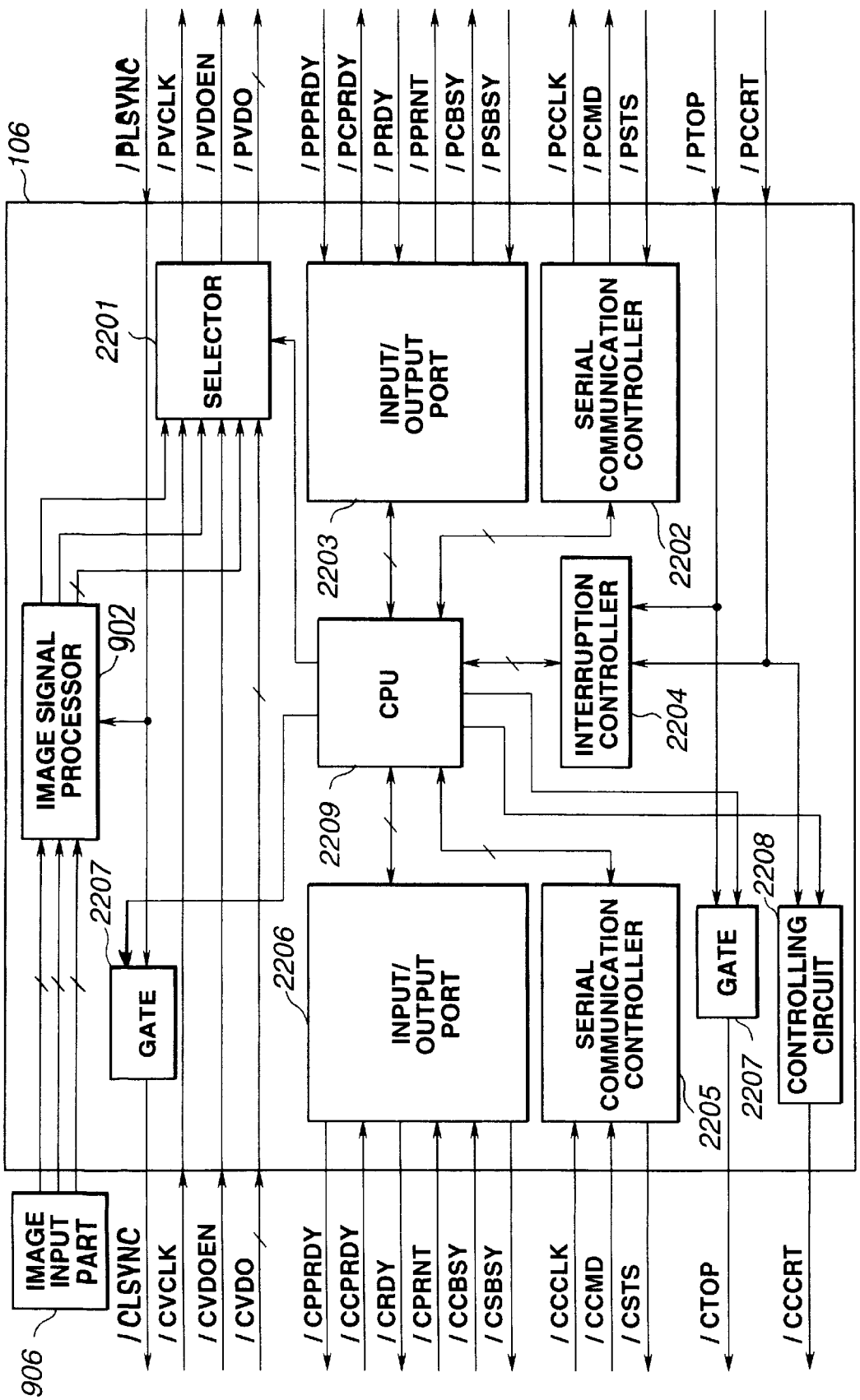
FIG. 12 is a block diagram, which shows an example of structure of the reader controller.

FIG. 12 is a block diagram of a structure example of reader controller 106.

In this drawing, CPU 2209 is a one-chip microcomputer and controls reader controller 106 on the whole.

Selector 2201 selects either those signals output from image processing part 902 or those signals output from printer controller 2103 and output them to DC controller 2002. Selector 2201 changes over three kinds of signals, image clock /VCLK, image enable /VDOEN, and image data VDO.

Serial communication controller 2202 serially communicates with DC controller 2002, and serial communication controller 2205 serially communicates with DC controller 2103. Input /output port 2203 supplements the communication by serial communication controller 2202, and input /output port 2206 supplements the communication by serial communication controller 2205.

/PTOP which indicates a top of an image and /PCCRT which indicates a status change of a printer are input to interruption controller 2204, and interruption controller 2204 generates an interruption signal for CPU 2209 based on them. Two gates 2207 control whether /PLSYNC and /PTOP, which are sent from DC controller 2002, should be sent to printer controller 2103 or not. In case the copy function is to be executed, two gates 2207 do not allow those signals to pass while in case the printer function is to be executed, two gates 2207 allow those signals to pass.

Control circuit 2208 has a gate function and a flag set function, and controls /CCRT. That is, control circuit 2208 controls, by open/close of the gates, whether /PCCRT, which is generated by DC controller 2002 and indicates a status change of a printer, should be sent to printer controller 2103 or not. Reader controller 106 can generate /CCCRT, which indicates a status change of a printer, for printer controller 2103.

Next, a copy operation, which involves reading a full-color original image and printing it, will be explained.

When a copy start key of operation part 905 (not shown) is pushed, reader controller 106 is set to the copy mode, gate 2207 and the gate of control circuit 2208 are closed, and selector 2201 is set to select the output of image processing part 902.

Next, reader controller 106 checks /PRDY, which is sent from DC controller 2002 through input/output port 2203, and performs several kinds of setting at printer engine 2102 through serial communication controller 2202. Concretely, reader controller 106 generates a command for designating a paper supply cassette which supplies recording paper, and a command for requesting the size of the recording paper, stored in the designated paper supply cassette. DC controller 2002 returns a status corresponding to the sequence of commands.

Next, reader controller 106 generates a command for designating the outlet of recorded papers, a page mode designation command for designating the number of pages to be formed, and a command for designating monochromatic/color image forming. After that the designations for printer engine 2102 are finished.

DC controller 2002 performs settings of printer engine 2102 which correspond to the sequence of commands.

Next, reader controller 106 generates /PPRNT for DC controller 2002 after it sends a command to transmission control part 904 and makes original transmission apparatus 801 supply an original on an original supporting plate.

In response to this, after a predetermined time, DC controller 2002 returns /PPRNT to reader controller 106. /PTOP is processed in interruption controller 2204 and reader controller 106 send a command to optical system controlling part 903 in order to make optical reading part 802 scan in synchronism with /PTOP. /PTOP is processed in interruption controller 2204, and reader controller 106 commands optical system controlling part 903 to make optical reader part 802 scan in synchronism with /PTOP. The image signal, of which the vertical scan(sub-scan) is synchronized with /PTOP and of which the horizontal scan (main-scan) is synchronized with /PLSYNC, is converted to /PVDO. /PVDO is transmitted to DC controller 2002 in synchronism with /PVCLK. When a color mode is set, an original is sub-scanned four times by optical reading system 802 in synchronism with /PTOP and four color component images of respective CMYK colored toners are formed and combined to form a full-color image.

After the last /PTOP is generated, reader controller 106 return /PPRNT to false.

DC controller 2002 detects the finish of print request by /PPRNT, and transits to the post processing, such as cleaning of intermediate transfer drum 405 by cleaner 422. On the other hand, recording paper on which toner image is transferred is output from designated outlet after passing fixing roller 407.

Finally, reader controller 106 confirms that transmission (discharge) of the recording paper is finished by the status from DC controller 2002.

After reader controller 106 confirms that the discharge is finished, end of the print job is confirmed, and reader controller 106 waits for a next copy request, or push of copy start key, with a ready status.

After the copy operation, reader controller 106 goes into a ready status. Then, reader controller 106 opens gate 2207 and the gate of controlling circuit 2208 and allow them to transmit /PLSYNC and /PTOP to printer controller 2103 for printing operations. Reader controller 106 checks whether /PRDY, which is sent from DC controller 2002 through input/output port 2203, is true or not, and if /PRDY is true, reader controller 106 sets /CRDY true through input/output port 2206. /CRDY is sent to printer controller 2103.

Next, printer controller 2103 communicates with printer engine 2102 to make various kinds of settings. Reader controller 106 receives a signal sent from printer controller 2103 through serial communication controller 2202 and performs the setting of printer engine 2102 through serial communication controller 2202 based on the contents of the setting. DC controller 2002 returns a status corresponding to the sequence of commands and reader controller 106 transfers the received status to printer controller 2103.

Next, printer controller 2103 generates /CPRNT. Reader controller 106 receives /CPRNT and sends /PPRNT to DC controller 2002. In response to this, after a predetermined time, DC controller 2002 returns /PTOP. /CTOP is sent from reader controller 106 to printer controller 2103 because the gate of controlling circuit 2208 in reader controller 106 is opened. The vertical scan (sub-scan) of an image is synchronized with /CTOP by printer controller 2103, while the horizontal scan (main-scan) of the image is synchronized with /CLSYNC, which is sent through gate 2207 of reader controller 106. Printer controller 106 forward /CVDO which is synchronized with /CVCLK. As selector 2201 of reader controller 106 is set to select the signal sent from printer controller 2103, /CVCLK, /CVDOEN and /CVDO are sent to DC controller 2002 as /PVCLK, PVDOEN and /PVDO.

The difference of image output timing between a printing operation and a copying operation will be explained.

Printer controller 2103 has an image memory for temporarily storing image data for printing. Accordingly, the time required for preparing output of /VDO in response to /TOP sent from DC controller 2002, is only electrical delay time.

Figure 13:
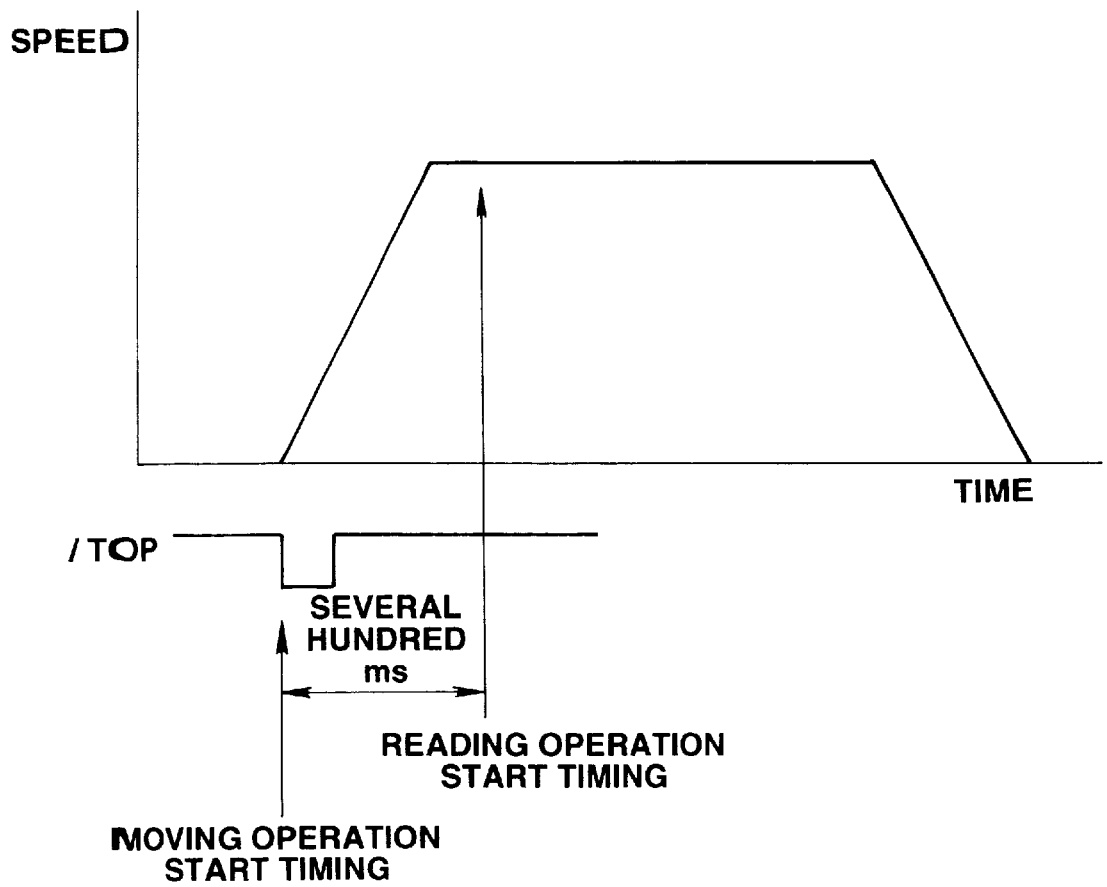
FIG. 13 is used to explain the time period required for optical reading part which is in a stopped condition to reach the speed for reading an original image.

On the other hand, in a copying operation, /VDO is output based on the image data obtained by reading an original image by making optical reading part 802 scan across the original image. Accordingly, as shown in FIG. 13, a time period of up to several hundred micro-seconds, may be required to accelerate optical reading part 802 from a stopped position, and making optical reading part 802 reach a speed for reading an original image. Consequently, if /TOP in copying operation is generated at the same timing as in printing operation, /VDO supply in copying operation will be delayed for several hundreds micro-second. There are at least two solutions for this problem as follows:

(1) output /TOP in copying operation earlier than in printing operation;

(2) use another signal (/RSTART) for copying operation.

According to (1), it is not necessary to change the structure of reader controller 106 in FIG. 12, since optical reading part 802 can be driven by /TOP.

Figure 14:
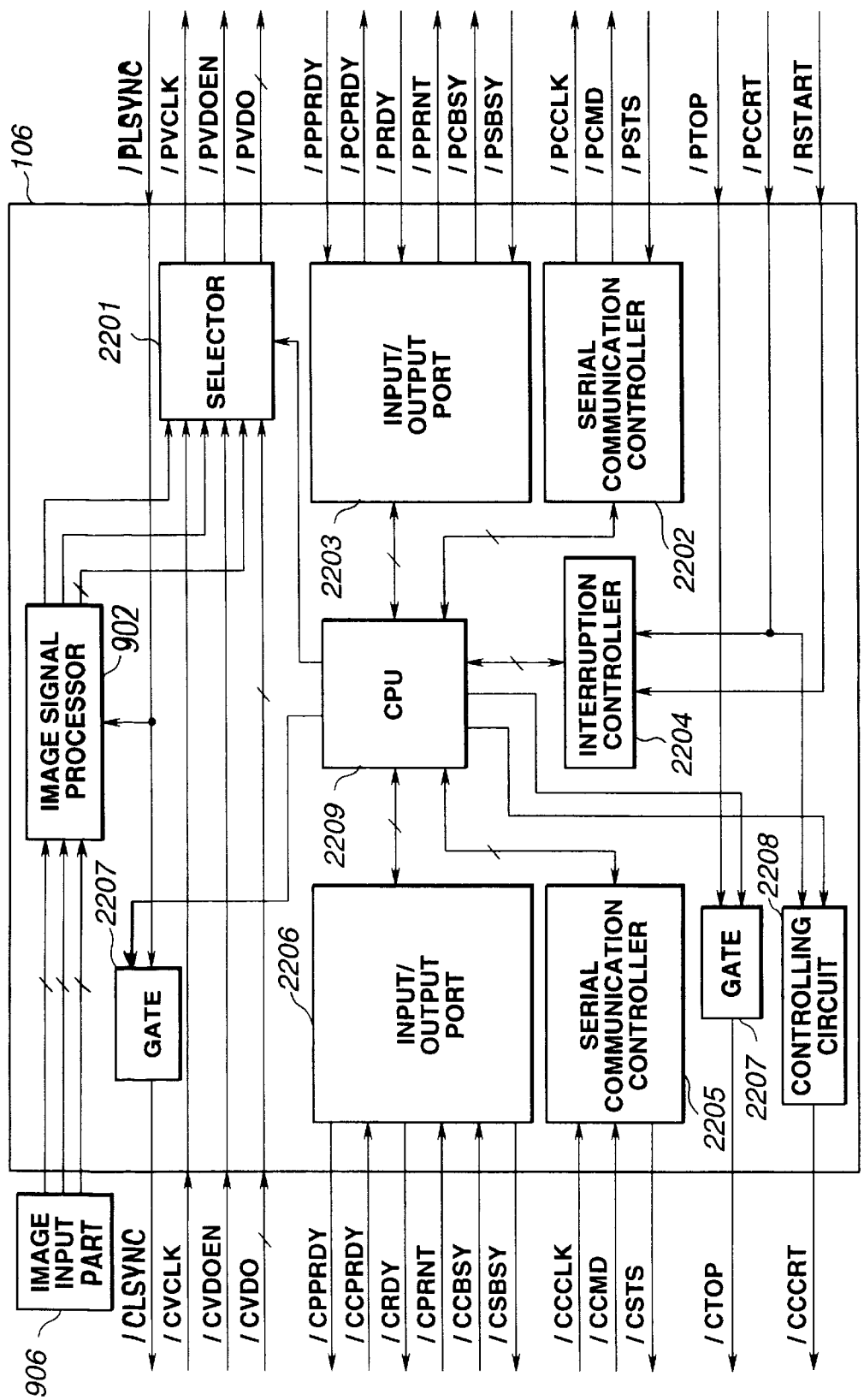
FIG. 14 is a block diagram which shows another example of a reader controller structure

According to (2), the structure of reader controller 106 can be formed as shown in FIG. 14. That is, /PTOP output from DC controller 2002 is necessary for printer controller 2103 to perform printing operation; however it is not necessary also to be supplied to interruption controller 2204 of reader controller 106. Also, /RSTART, which is output from DC controller 2002 and requests movement start of optical reading part 802, is necessary for copying operation; however it is not necessary to be sent to printer controller 2103.

Because reader controller 106 is connected between printer controller 2103 and DC controller 2002, the communication between printer controller 2103 and DC controller 2002 becomes as follows.

This embodiment explains the case that a setting command, such as a command for changing paper supply cassette, is issued from printer controller 2103 to printer engine 2102 during the copy operation by reader controller 106.

Figure 15A:
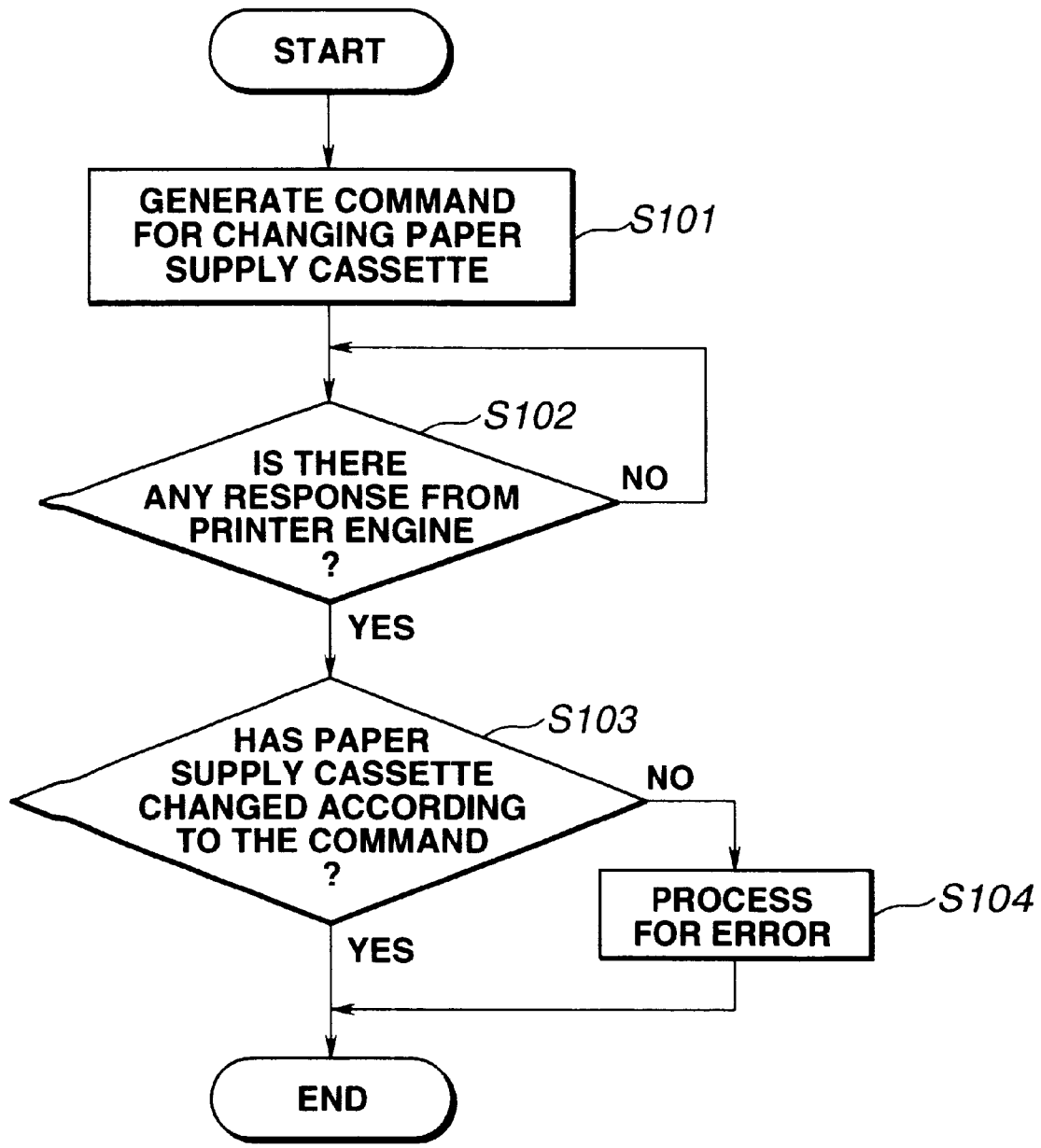
FIG. 15A shows a process sequence example of a printer controller.
Figure 15B:
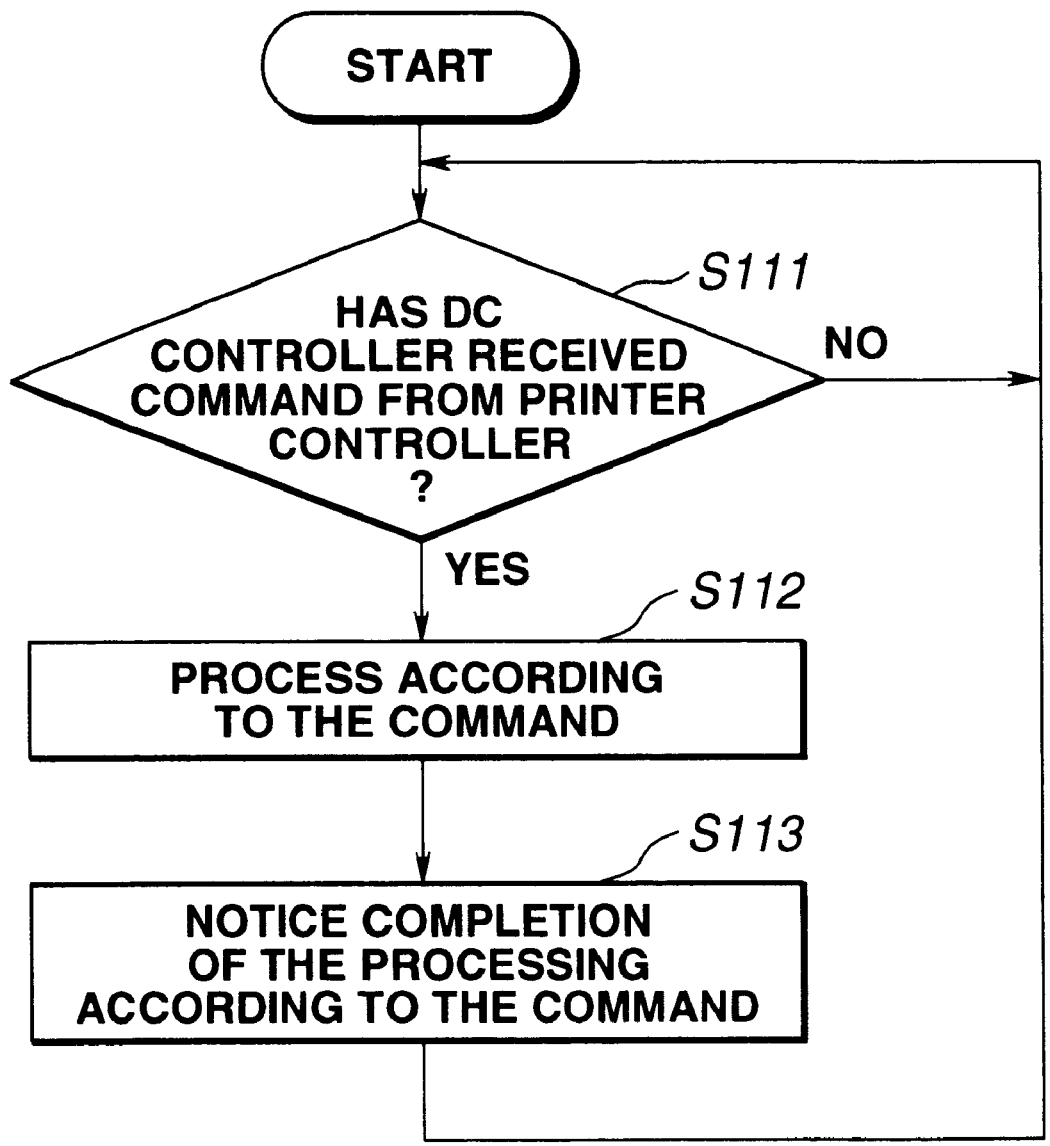
FIG. 15B shows a process sequence example of a DC controller.

FIGS. 15A and 15B show an example of a command generation sequence in case reader controller 106 is not inserted between printer controller 2103 and DC controller 2002. FIG. 15A shows an example of process sequence of printer controller 2103, and FIG. 15B shows an example of process sequence of DC controller 2002. Each of the sequences is executed by CPU in each of controllers.

Printer controller 2103 generates a change command of paper supply cassette in step S101. In step S102, printer controller 2103 waits for the response (receiving status) from DC controller 2002. If printer controller 2103 receives the response, it judges whether paper supply cassette is changed by a command in step S103. If the paper supply cassette is not changed, printer controller 2103 performs error processing and a sequence of command generation ends in step S104.

On the other hand, when DC controller 2002 receives a command from printer controller 2103 in step S111, it judges the contents of the command and changes the paper supply cassette. After finishing the change of the paper supply cassette in step S113, DC controller 2002 notifies the success of paper supply cassette change to printer controller 2103.

Figure 16A:
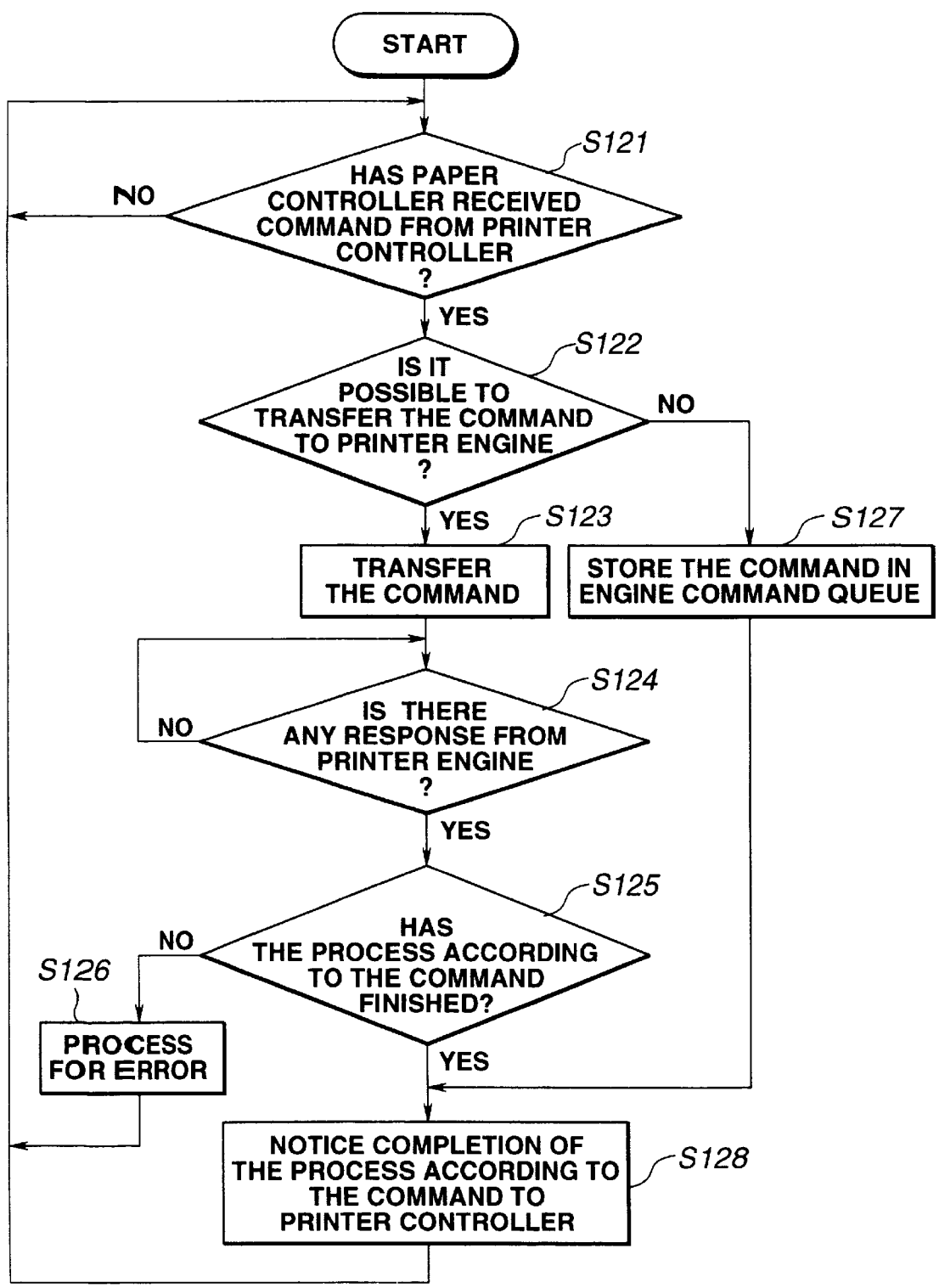
FIG. 16A shows a process sequence example of receiving commands from the printer controller and sending status to the printer controller.
Figure 16B:
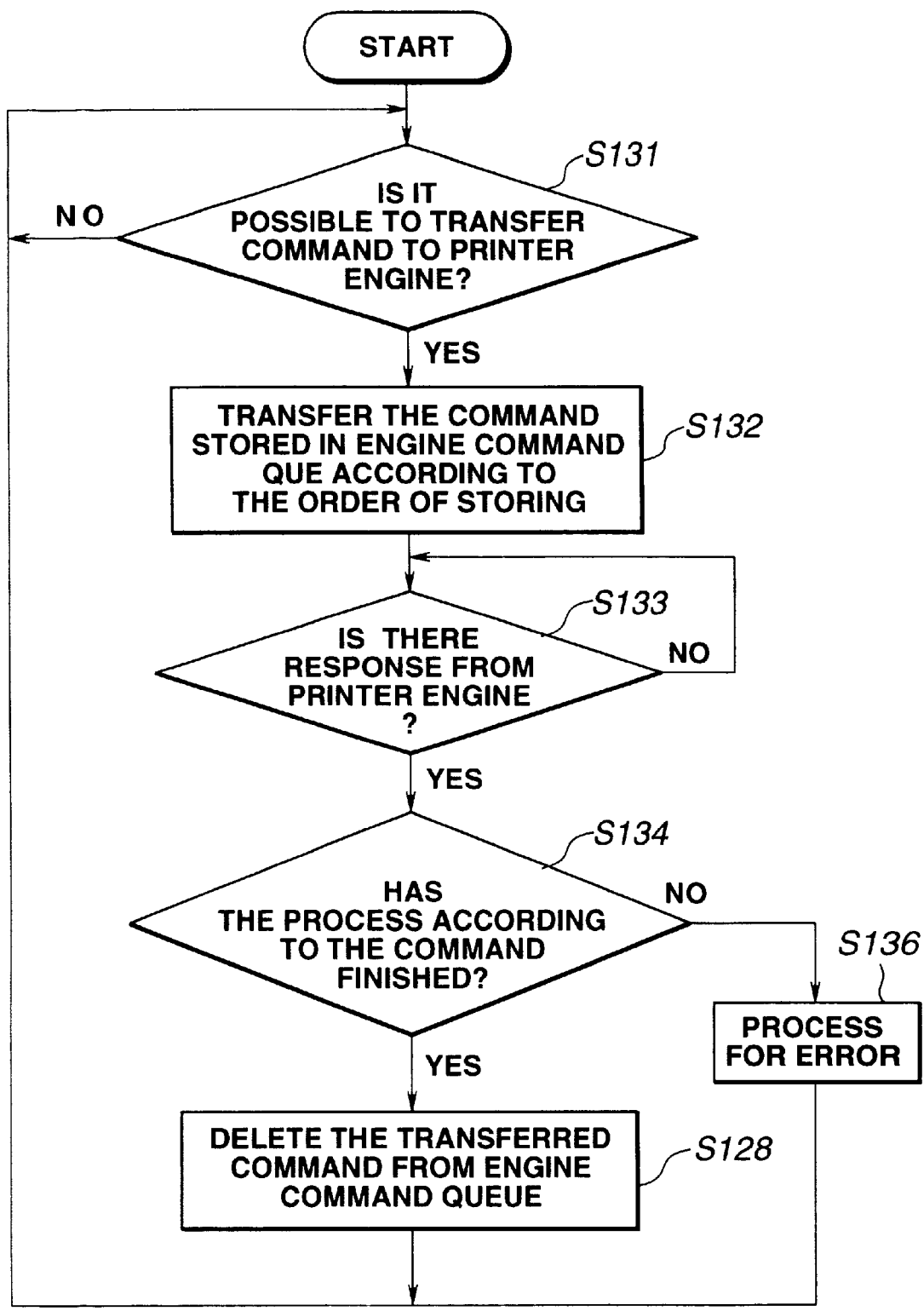
FIG. 16B shows a process sequence example of sending the command stored in engine command queue to a DC controller.

FIGS. 16A and 16B show an example of a command generation sequence in case reader controller 106 is inserted between printer controller 2103 and DC controller 2002. FIG. 16A shows an example of process sequence in which reader controller 106 receives a command from printer controller 2103 and returns a status to printer controller 2103. Here, printer controller 2103 and DC controller 2002 perform processing shown in FIG. 15A and 15B. The sequences shown in FIGS. 16A and 16B are executed by CPU 2209 in reader controller 106.

Reader controller 106 judges whether it has received a command from printer controller 2103 in step S121. If reader controller 106 has received the command it judges whether the command can be transferred immediately to DC controller 2002 in step S122. For example, in case reader controller 106 is now in a wait state, reader controller 106 can transfer the command, which is sent from printer controller 2103, to DC controller 2002. However, in case reader controller 106 is executing copying operation, if reader controller 106 immediately transfers the paper supply cassette change command, which is sent from printer controller 2103, to DC controller 2002, the copying operation can not properly be executed.

In case the command can be transferred immediately, reader controller 106 transfers the command in step S123, after which reader controller 106 waits for response (receiving status) from DC controller 2002 in step S124. If reader controller 106 receives the response, it judges whether paper supply cassette has been changed by a command in step S125. If the paper supply cassette has not been changed, reader controller 106 performs error processing, including processing of sending a corresponding status to printer controller 2103 in step S126. While if the paper supply cassette has been changed, reader controller 106 sends a corresponding status to printer controller 2103 in step S128.

On the other hand, in case the command can not be transferred immediately, reader controller 106 stores the commands, which are issued from printer controller 2103 to DC controller 2002, in the engine queue in order of issue in step S127. After that reader controller 106 sends a status which indicates the change of the paper supply cassette in step S128, though actually the paper cassette has not been changed. Engine command queue is provided in a memory, such as internal RAM, of CPU 2209.

FIG. 16B shows an example of process sequence in which reader controller 106 sends a command stored in engine command queue to DC controller 2002.

When reader controller 106, in step S131, comes to the condition that it can transfer the command stored in the engine command queue to DC controller 2002 after a copying operation, it transfers the command stored in the engine command queue to DC controller 2002 in step S132. After that, reader controller 106 waits for the response (receiving status) from DC controller 2002 in step S134. When reader controller 106 receives the response, it judges, in step S134, whether the paper supply cassette has been changed according to the command. In case the paper supply cassette has not been changed, reader controller 106 performs error processing in step S136. Finally, in case the paper supply cassette has been changed, reader controller 106 deletes the transferred command from engine command queue in step S135.

In this way, even if reader controller 106 is inserted between printer controller 2103 and DC controller 2002, it is possible to execute a command process sequence without preventing proper communication between printer controller 2103 and DC controller 2002.

Next, in a structure, where reader controller 106 is inserted between printer controller 2103 and DC controller 2002, the status change of printer engine 2102, for example in case some error occurs in printer engine 2102, will be explained.

The status change of printer engine 2102 is transmitted from DC controller 2002 to reader controller 106 by /PCCRT. However, the status change which reader controller 106 wants to know might be different from the status change which printer controller 2103 wants to know. For example, only reader controller 106 wants to know a jam which occurred during the transmission of recording paper during copying operation. Even if printer controller 2103 knows the occurrence of jam, it can not make proper post processing because the printing operation is not from printer controller 2103.

In order to cope with the status change in copying operation, the same control software as provided in reader controller 106 might be provided in printer controller 2103. However, such a case is not preferred since it requires time for designing the software, time for testing the software and memory for storing the software. It is considered better to notify the status change in printing operation to printer controller 2103 while to notify the status change in copying operation to reader controller 106.

Figure 17:
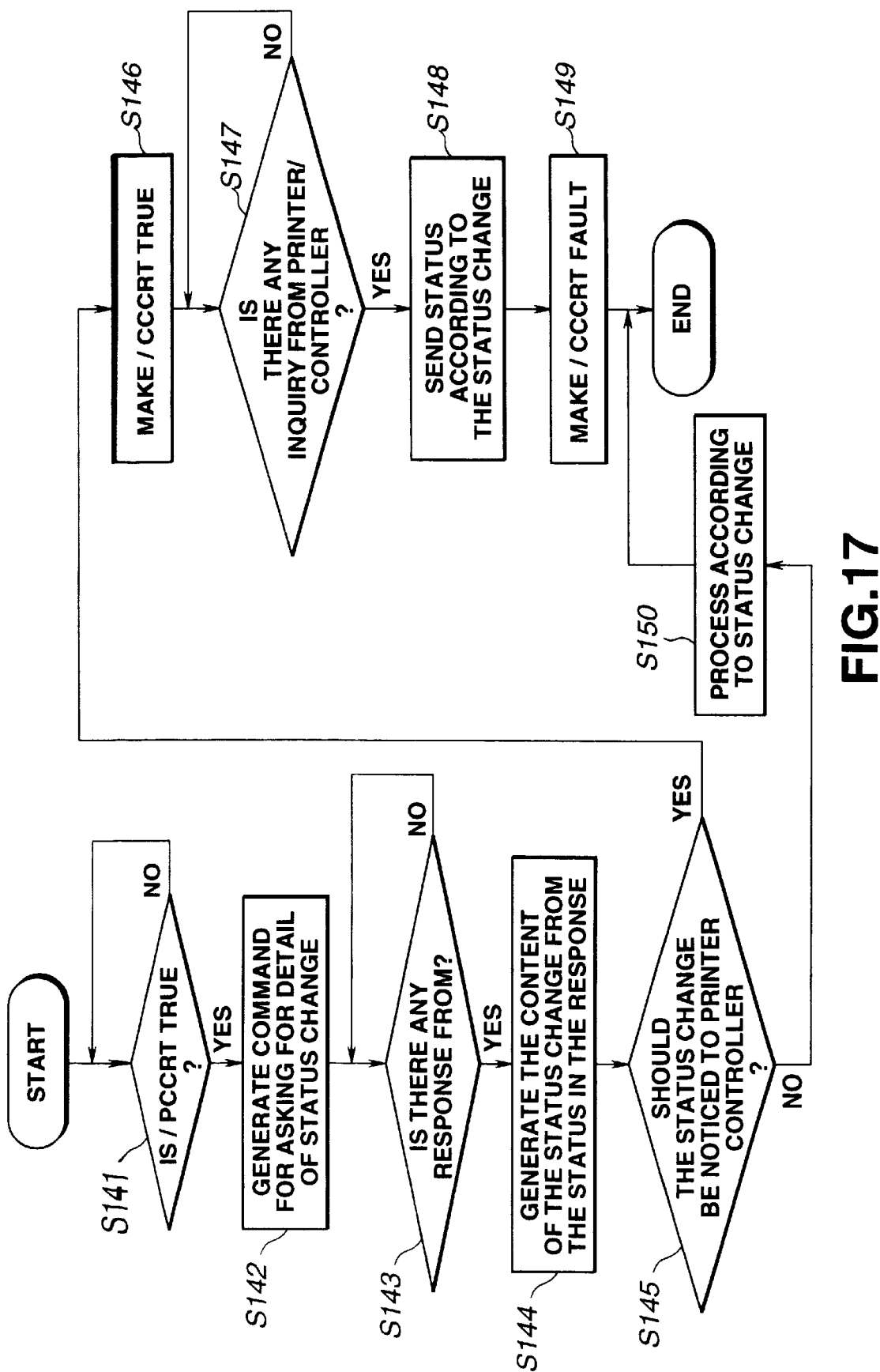
FIG. 17 is a flowchart showing a control example of the reader controller in response to a condition change.

At the same time, it is also considered better to notify some status changes in copying operation, for example, change of recording paper size or no paper, to printer controller 2103, too. However, it is not necessary to perform such a status change process immediately after the generation of /PCCRT because the timing for performing this process does not have to being defined strictly. Accordingly, the preferred process is as follows:

FIG. 17 is a flowchart expressing an example of control, by which reader controller 106 copes with the status change.

During copying operation, reader controller 106 closes the gate of control circuit 2208 and masks /PCCRT, which is sent from DC controller 2002, against printer controller 2103. When reader controller 106 detects that /PCCRT has become true in step S141, it generates a command for requesting the detail of status change for DC controller 2002 in step S142 and waits for the response from DC controller 2002 in step S143. When reader controller 106 receives the response (status), it understands the status change in printer engine 2102 based on the status in step S144.

Reader controller 106 judges whether the contents of the generated status change should be notified to printer controller 2103, too, in step S145. For example, in case paper supply cassette or recording paper size is changed, reader controller 106 notifies the status change to printer controller 2103 by /CCCRT in step S146, and waits for the request from printer controller 2103 in step S147. When reader controller 106 receives the request, it notifies the content of the status change to printer controller 2103 as a status in step S148, and after that it makes /CCCRT false. If it is not necessary to notify the status change to printer controller 2103, reader controller 106 performs the process coping with the status change in step S150.

On the other hand, during printing operation, as discussed above, reader controller 106 opens the gate of control circuit 2208 and transfers /PCCRT, /PSTS, which are sent from DC controller 2002, to printer controller 2103 as /CCCRT, /CSTS and transfers /CCMD, which is sent from DC controller 2002, to DC controller 2002 as /PCMD. Accordingly, in a printing operation, the process disclosed in FIG. 17 is not strictly necessary.

Next, the control by reader controller 106, in case a print request by printer controller 2103 occurs during copying operation by reader controller 106, will be explained.

Figure 18:
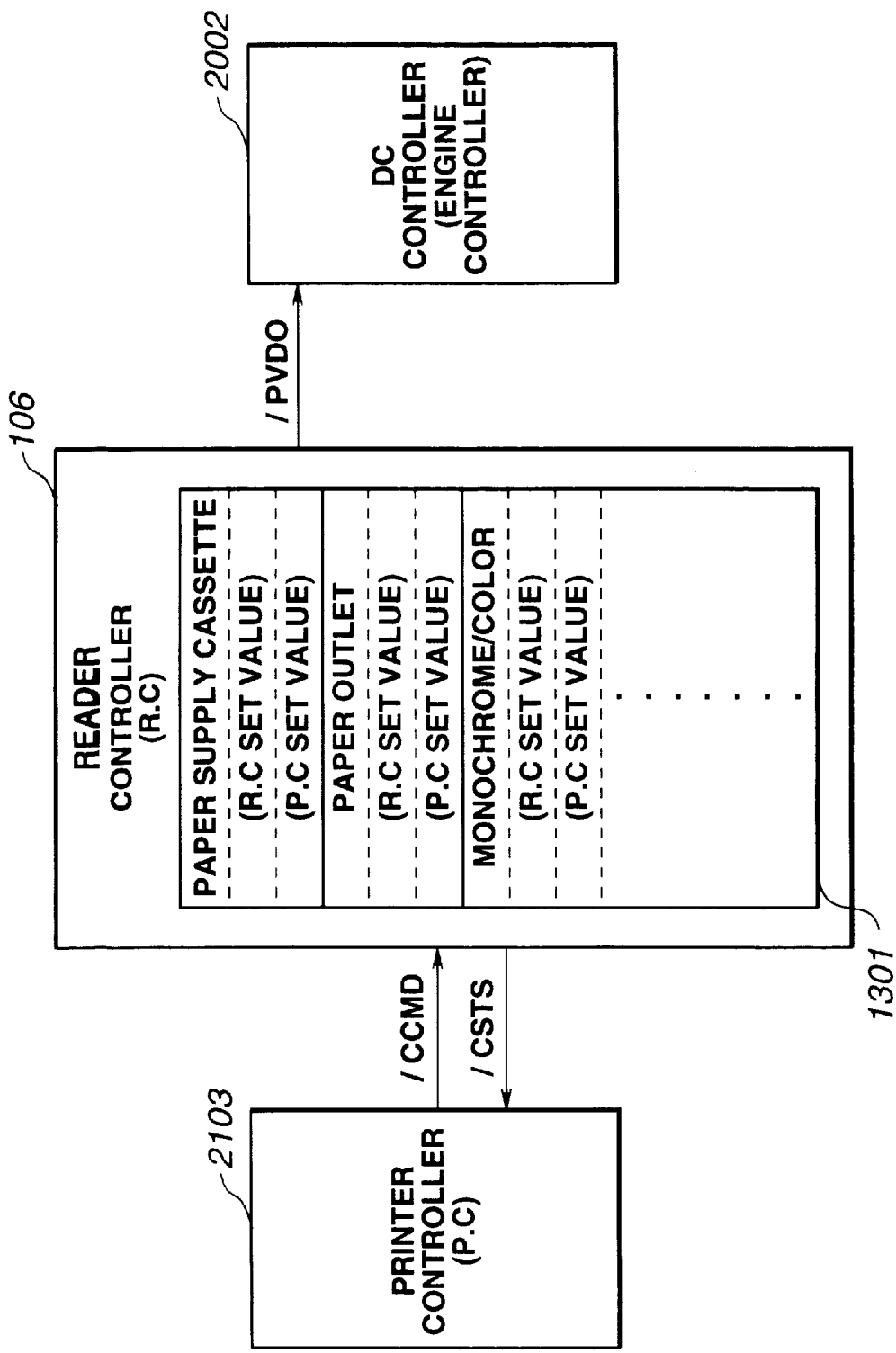
FIG. 18 explains a control in case a printing request occurs during copying operation.

FIG. 18 explains the control in case the print request occurs during the copying operation. In this case, DC controller 2002 performs an image forming process based on /PVDO sent from reader controller 106. The image forming process, as discussed above, is performed based on the image forming condition, such as paper supply cassette, outlet, page mode, monochromatic/color, set by serial communication between reader controller 106 and DC controller 2002.

Reader controller 106 has set value buffer 1301, which stores the image forming condition set to DC controller 2002. Also, the image forming condition, which is set to DC controller 2002 by printer controller 2103, is stored in set value buffer 1301. Here, set value buffer 1301 is included in an internal RAM of CPU 2209 in reader controller 106.

When a print request is sent from printer controller 2103 during copying operation, printing operation is postponed until the copying operation ends because it is not preferable to perform printing operation in the middle of the copying operation by interrupting the copying operation. However, reader controller 106 must return /CSTS in response to /CCMD from printer controller 2103. Accordingly, reader controller temporarily writes the value, which corresponds to the image forming condition designated by printer controller 2103, into the address for printer controller (P.C.) of set value buffer 1301.

After finishing the copy operation, in case the value stored in the address for P.C. and the value stored in the address for reader controller (R.C.) are different each other, reader controller 106 sets image forming condition based on the value stored in the address for P.C. before starting the start of printing operation.

Concretely, it is supposed that settings are such that paper is supplied from upper cassette, discharge is from the face-up outlet, and printing is in the color mode, and a copying operation is now on going.

Here, printer controller 2103, which generates a print request, can set various settings even if execution of the printing operation is postponed. For example, if the condition of the print request is to form a monochromatic image by supplying a paper from upper cassette and to discharge it from face-up outlet, reader controller 106 does not have to generate a command for designating paper supply cassette and outlet for DC controller 2002 when the operation is changed from copying mode to printing mode. This is because both reader controller 106 and printer controller 2103 have already designated the paper supply from upper cassette, and discharge from face-up outlet. However, as for image forming mode, reader controller 106 has to generate a command for designating the monochromatic image forming to DC controller 2002 after finishing the copying operation.

In this way, reader controller 106 not only postpones the transfer of the command to DC controller 2002 in response to the command, such as print request, from printer controller 2103 but also judges the image forming condition, which is already set to DC controller 2002, in order to avoid the repetition of setting.

Figure 19:
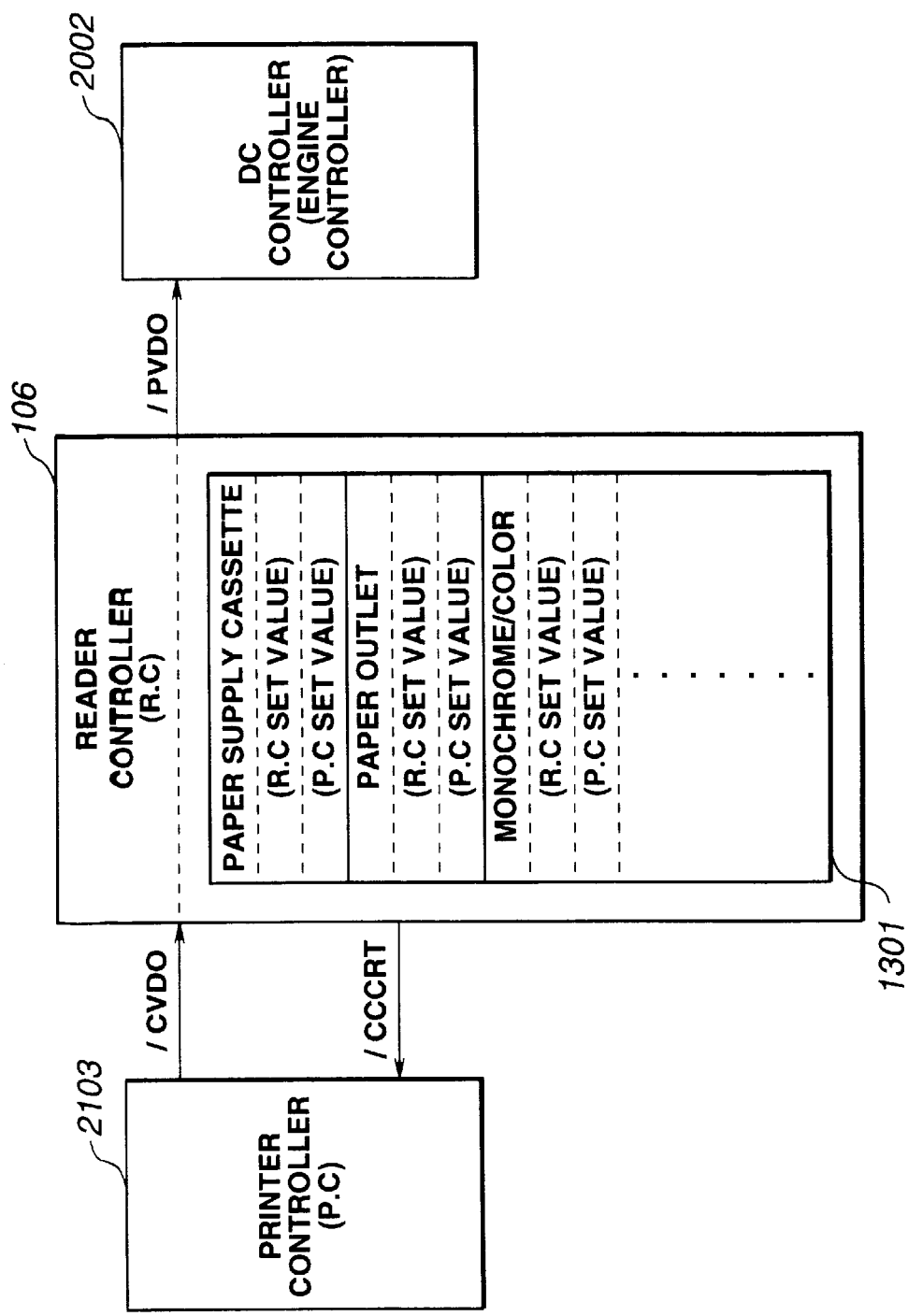
FIG. 19 explains a control in case a copying request occurs during printing operation.

FIG. 19 explains the control in case a copy request occurs during a printing operation. In this case, DC controller 2002 performs image forming operation based on /PVDO sent from printer controller 2103 through selector of reader controller 106. Also, the image forming condition is set to form a monochromatic image by supplying a paper from upper cassette and to discharge it from face-up outlet.

Figure 20:
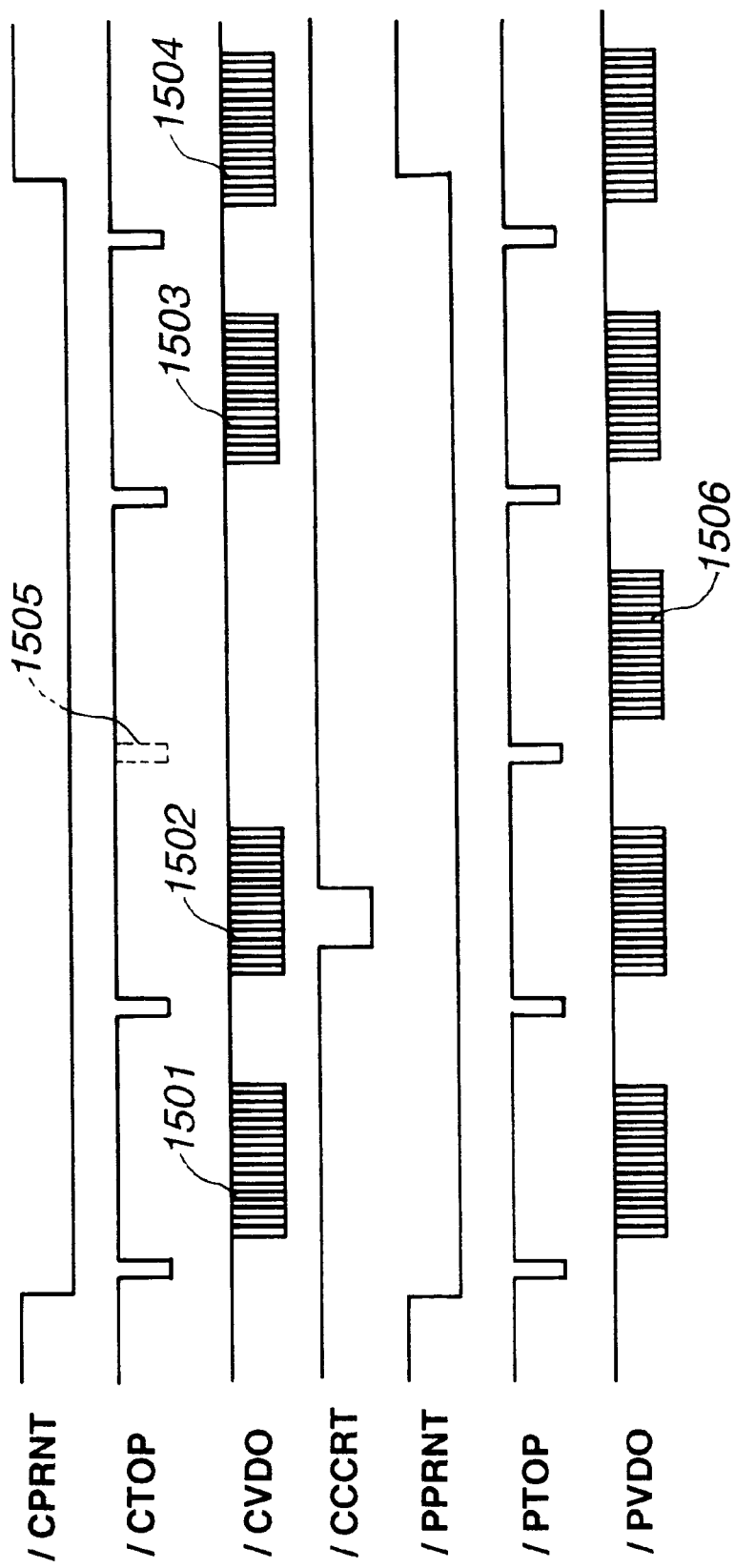
FIG. 20 is a timing flowchart explaining control in case a copying request occurs during printing operation.

It is preferable to perform copying operation by interrupting an on-going printing operation (herein after "interruption copy") when the copy request is generated from reader controller 106 during the printing operation. FIG. 20 is a ltiming chart for explaining control in case the copy request is generated during the printing operation.

/CPRNT output from printer controller 2103 is sent to DC controller 2002 by reader controller 106 as /PPRNT. /PTOP, which is output from DC controller 2002 in response to /PPRNT, is sent to printer controller 2103 by reader controller 106 as /CTOP. Printer controller 2103 outputs /CVDO 1501 in response to /CTOP. If printer controller 2103 is going to execute four prints, /CVDO for one sheet is output each time when it receives /CTOP. Accordingly receiving four /CTOP will complete the printing operation. After receiving the fourth /CYOP, printer controller 2103 makes /CPRNT false. DC controller 2002 realize the finish of printing operation by detecting that /CPRNT (/PPRNT) becomes false.

If an instruction which commands to make one copy based on a color original is input from operation part 905 during second printing operation, which corresponds to /CVDO 1502, reader controller 106 generates /CCCRT for printer controller 2103. This signal does not indicates the status change of printer engine 2102, but request of reader controller 106 for printer controller 2103 to release printer engine 2102. Printer controller 2103, as mentioned above, generates a command to know the contents of the status change in response to /CCCRT. Reader controller 106 returns a status indicating "now copying" in response to the command. Printer controller 2103, which receives the status indicating "now copying", keeps /CPRNT true and waits for receiving next /CTOP. Printer controller 2103 usually performs time-out judgement in case that /CTOP can not be received a predetermined time after it makes /CPRNT true. However, reader controller 106 waits for receiving /CTOP by releasing time-out judgement in case the status indicates "now copying".

After finishing second printing operation and outputting /PTOP from DC controller 2002, reader controller 106 outputs /PVDO 1506, which is generated by reading an original image based on copy instruction, without transferring /CTOP to printer controller 2103 by masking /PTOP as shown in 1505 of FIG. 20. After finishing interruption copy, reader controller 106 removes the mask of /PTOP and transfers /PTOP sent after that to printer controller 2103 as /CTOP. Accordingly, printing operation is restarted and printer controller 2103 outputs /CVDO 1503 and /CVDO 1504.

In this way, according to the condition of printer controller 2103 and reader controller 106, reader controller 106 judges and controls operations (copying/printing) performed by printer engine and command generation timing. Accordingly, it is possible to realize the demands from printer controller 2103 and reader controller 106.

Figure 23:
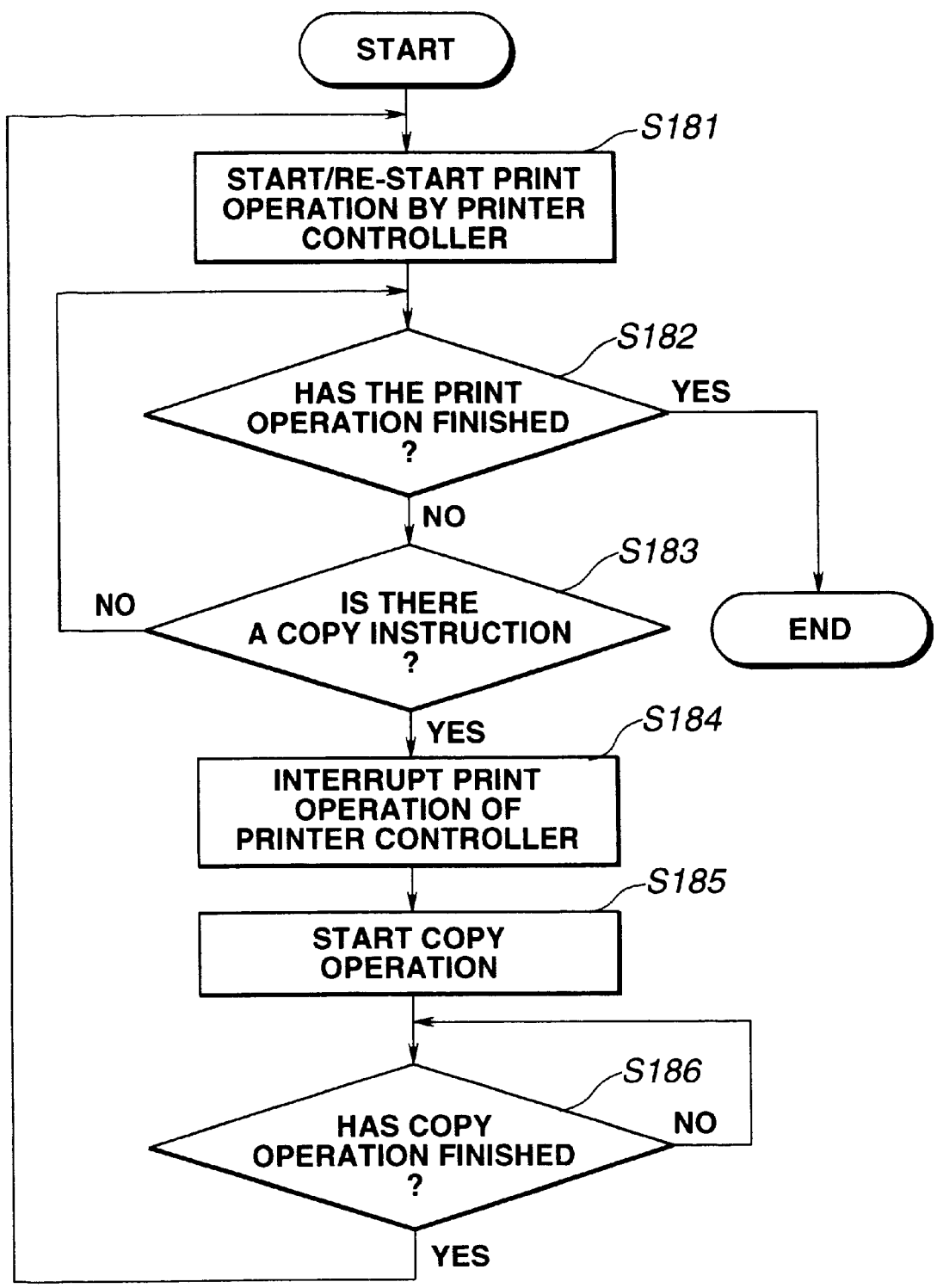
FIG. 23 explains an interrupting copy control sequence.

FIG. 23 explains a control sequence of interruption copy. The sequence is realized by reader controller 106.

In FIG. 23, after the printing operation by printer controller 2103 is started in step S181, reader controller 106 judges whether the printing operation is finished or not in step S182 and whether copying operation is instructed or not in step S183. In case the printing operation is finished, the control sequence will be ended. However, in case the copying operation is instructed during the printing operation, reader controller 106 temporarily interrupts the printing operation by printer controller 2103 in step S184, and executes the requested copying operation of an original image by DC controller 2002 in step S185. Reader controller 106 waits for the end of the copying operation in step S186, and after finishing the copying operation, it restarts the printing operation interrupted in step S181.

Next, an explanation is given for control which is executed in case a command confirming the contents of the setting is generated by printer controller 2103.

Printer controller 2103 generates a command confirming the contents of the setting as /CCMD when it wants to know settings status such as image forming conditions set to DC controller 2002. After receiving this command, the reader controller 106 checks set value storing buffer 1301 and if the value corresponding to the information that printer controller 2103 wants to know is stored in set value storing buffer 1301, the value is read out and a status corresponding to the value is sent to printer controller 2103 as /CSTS.

On the other hand, reader controller 106 generates a command confirming the contents of setting as /PCMD if the value corresponding to the information, which printer controller 2103 wants to know, is not stored in set value storing buffer 1301.

After receiving this command, DC controller 2002 sends a status indicating the contents of setting, which corresponding to the command, to reader controller 106 as /PSTS. Reader controller 106 notifies the status to printer controller 2103 as /CSTS.

Next, density control will be explained.

Especially when a color image is formed, if the density balance of the color components CMYK which are used for image forming is not good, a proper image cannot be outputted. The reason for the density unbalance is, for example, build up of remained charge on the photosensitive member caused by repetition of image forming, temperature or humidity change or change in circumstances where the apparatus is set up. Accordingly, a proper image cannot be formed by the initial condition of the apparatus. Therefore, the control for keeping the density balance constant is performed in accordance with the several factors, which cause the density unbalance.

In this embodiment, the factors which are to be detected are as follows: "continuous still time in standby condition", "number of discharged recording paper (hereinafter "accumulated number"), and "number of images formed on intermediate transfer member (hereinafter "accumulated image number") which are detected CPU (not shown in Figures) equipped on DC controller 2002 and temperature or humidity detected by monitoring, by CPU of DC controller 2002, the input from an environment sensor in printer apparatus 2001.

Figure 21:
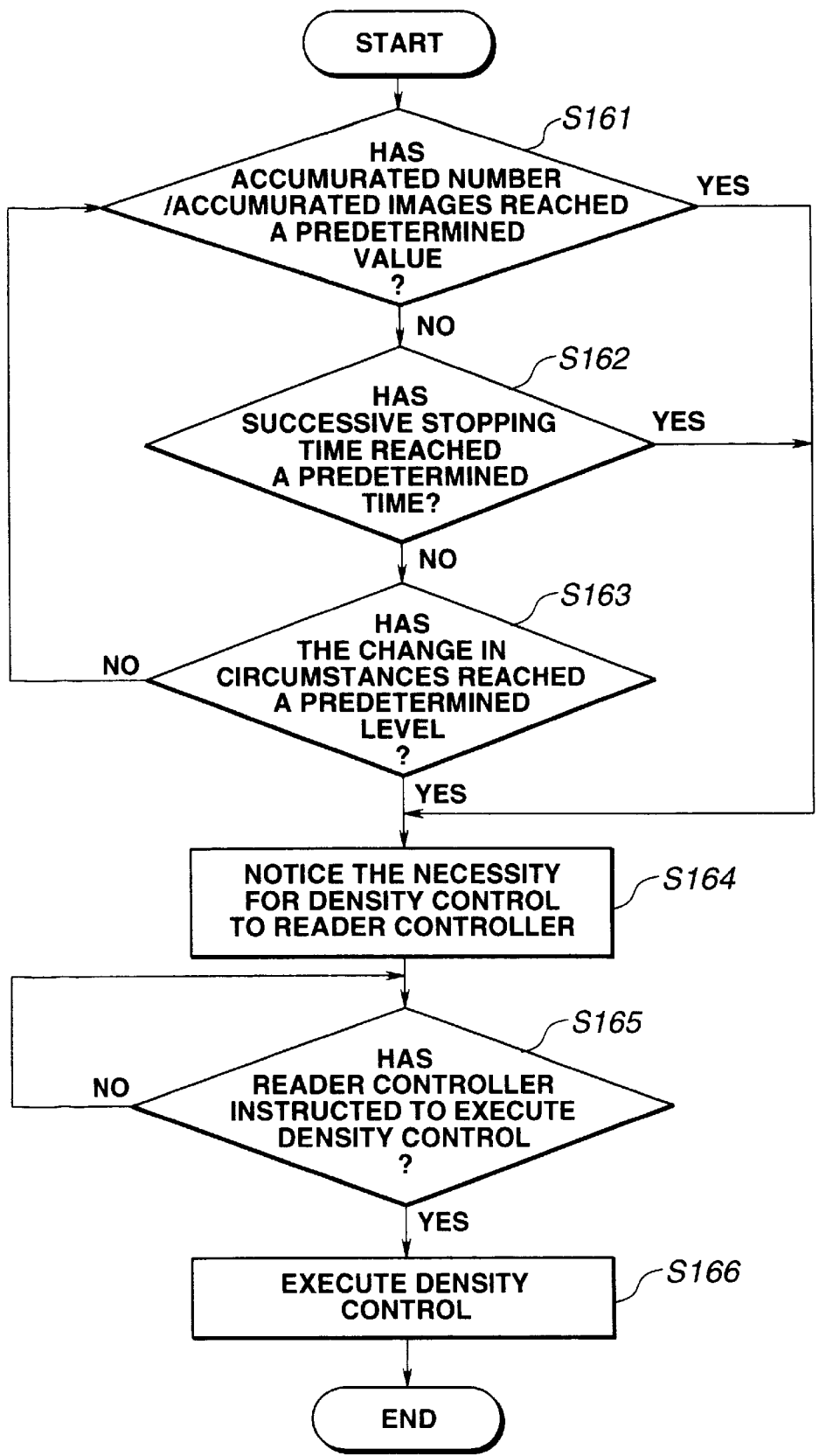
FIG. 21 shows a control sequence relating to the judgement of necessity for and execution of density control by DC controller.

FIG. 21 shows a control sequence relating to judgment of the necessity for and execution of the density control by DC controller 2002. The control sequence is executed by CPU in DC controller 2002 which is always monitoring the change of factors to be detected.

In step S161, accumulated number / accumulated image number is judged. In step S162, it is judged whether the continuous still time has reached to a predetermined value at which density control is considered to be necessary. In step S163, it is judged whether change of environmental condition, such as temperature or humidity, has reached to a predetermined value at which density control is considered to be necessary.

In case the density control is judged to be necessary, DC controller 2002 transmits the necessity to reader controller 106 by using /PCCRT or /PSTS. Next, in step S165, the CPU waits for the instruction of execution of the density control by reader controller 106. Right after receiving the instruction, in step S166, the CPU starts the density control.

Figure 24:
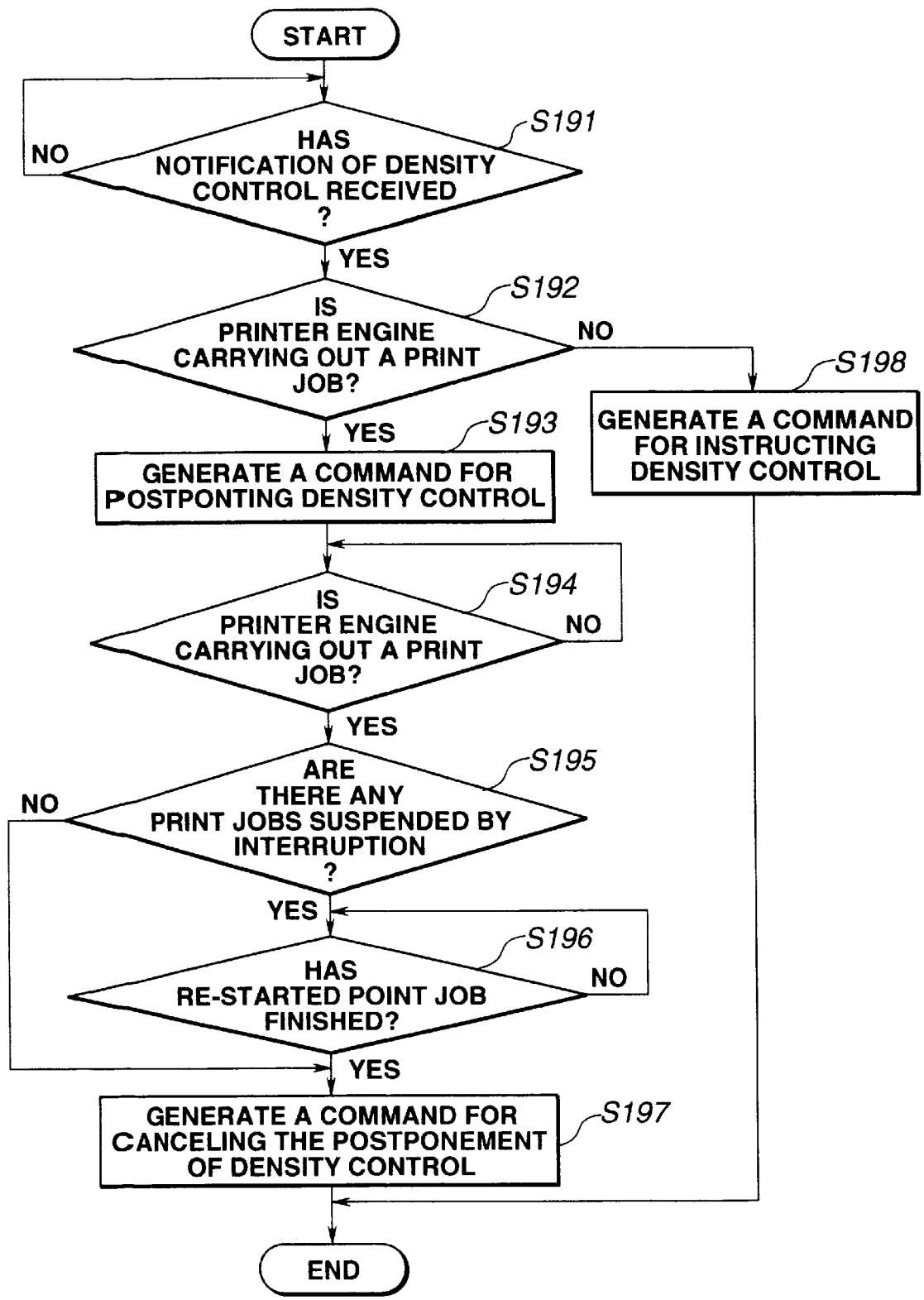
FIG. 24 explains a control sequence of reader controller to which the necessity for density control is transmitted.

FIG. 24 explains the control sequence of reader controller 106, to which the necessity of the density control is transmitted.

In step S191, after receiving the notification of the density control, reader controller 106 judges whether it is a suitable timing for executing the density control from the whole operating condition of printer apparatus 2001 when the notification is received. This is because it takes a relatively long time to execute the density control and it is not preferable to execute the density control during a sequence of print jobs as the color tones of the output images before and after the density control are different each other.

That is, in step S192, it is judged whether a print job is in progress, and if the print job is in progress, in step S193, a command for postponing the density control is generated. Further, if the print job is not in progress, in step S198, a command for instructing the execution of the density control is generated and process is ended.

In case the postponing of the density control is instructed, in step S194, printer controller 106 waits for the finish of the print job in progress. After the finish the print job, in step S 195, reader controller 106 judges whether there is any print job, which is interrupted by interruption copy. If there is any interrupted print job, in step S196, reader controller 106 restarts the interrupted print job and waits for the finish of the print job. After that, in step 197, reader controller 106 generates a command for releasing the postponing of the density control and the process ends.

Next, the contents of the density control will be explained. When the execution of the density control is necessary, the density of whole output image is usually decreasing. The main purpose of the density control is to put the lowered density back to the proper value.

Figure 22:
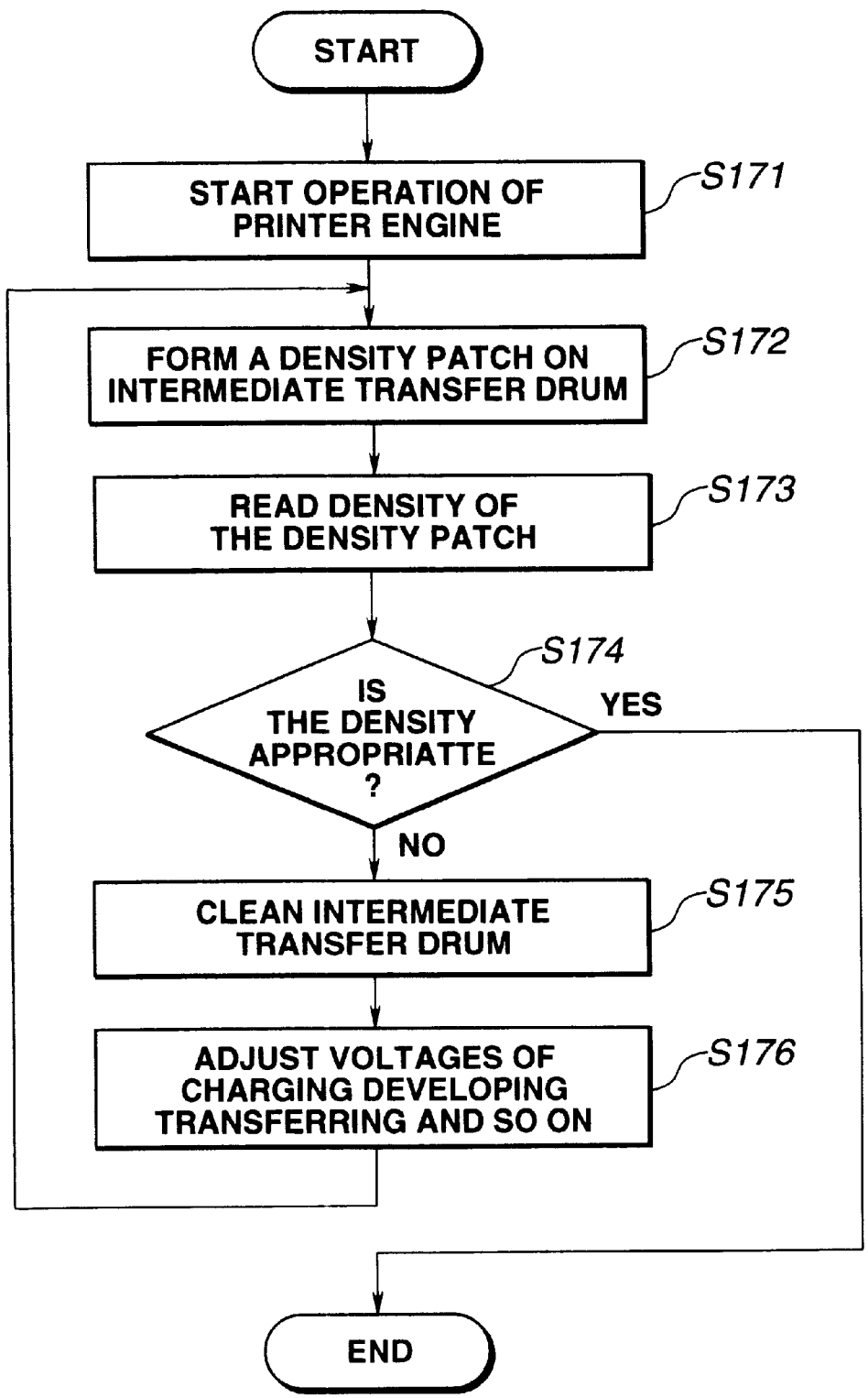
FIG. 22 explains a density control sequence.

FIG. 22 is a drawing is commanded for explaining the density control sequence. When the execution of the density control, DC controller 2002 starts the operation of printer engine 2102.

After the operation of printer engine 2102 reaches a steady state, DC controller 2002 forms a density patch corresponding to a predetermined density on intermediate transfer drum 405 in step S172. Here, "reaching a steady state" means that an operation parameter, such as the rotation speed of the polygon mirror for scanning a laser beam and the temperature of the fixing device for fixing a toner image, reaches a predetermined value. A density patch pattern for forming density patch is formed by an electronic circuit, such as a gate array mounted on DC controller 2002.

Density sensor 419 is provided near intermediate transfer drum 405. DC controller 2002 reads the density of the density patch formed on intermediate transfer drum 405 by using the signal output from density sensor 419 in step S173. DC controller 2002 judges whether the obtained value indicates the ideal density of the density patch pattern in step S174. If the obtained density is beyond a predetermined acceptable ideal density range, DC controller 2002 cleans intermediate transfer drum 405 in step S175 and adjusts density control parameters for image forming by electrophotographic method, such as density correction table (for correcting print data), charging voltage, developing voltage and transfer voltage (for adjusting process condition) in step S176.

After that, returning to step S172, DC controller 2002 forms density patch again, reads the density of density patch in step S173, and judges whether the density is a proper density or not. Formation of the density patch and adjustment of the density control parameters are executed for each color component.

With above mentioned density control, it is possible to correct the density unbalance caused by change after elapse of time or environmental change.

According to the embodiment explained above, it is possible to adjust image forming conditions after finishing the print job which is going on, even if adjustment of the image forming condition of the image forming part, such as density adjustment, becomes necessary during the execution of the print job.

Also, it is possible to adjust image forming conditions after finishing the interrupting job and interrupted job, even if adjustment of the image forming condition of the image forming part becomes necessary during the execution of the print job.

(Second Embodiment)

In case a plurality of different kind of print jobs are allowed to interrupt each other, shown as the image forming system in FIG. 1, and interruption print jobs are instructed successively against the print job now going on, even if the necessity of adjusting image forming condition arises and execution of the adjustment is requested, the adjustment the image forming condition would continue to be postponed. Accordingly, it is feared that an image of proper density and proper density balance can not be outputted.

Therefore, another example of the image forming system, which allows the interruption of print jobs, as show in FIG. 1, and is capable of adjusting image forming condition of the image forming part at a proper timing when the necessity of adjusting arises is explained as follows.

Figure 26:
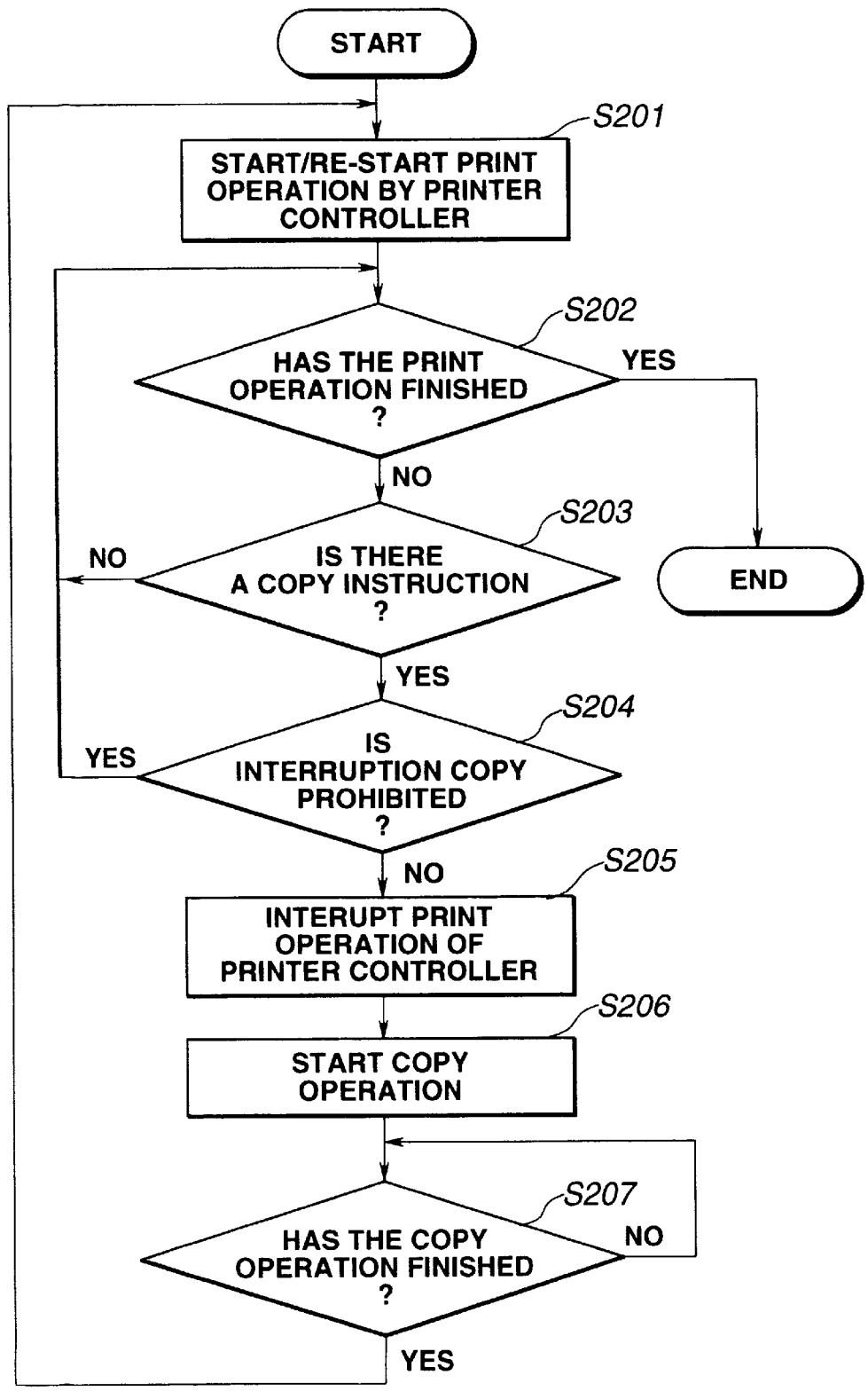
FIG. 26 explains another example of an interrupting copy control sequence.

FIG. 26 explains the control sequence of interruption copy, which is executed by reader controller 106.

In FIG. 26, when the printing operation is started by printer controller 2103 in step S201, reader controller 106 judges whether the printing operation is finished or not in step S202 and judges whether there is a copying instruction or not in step S203.

When the printing operation ends, the control sequence ends. However, in case there is a copy instruction during the printing operation, reader controller 106 judges whether the interruption copy is prohibited or not, in step S204. If interruption copy is available, reader controller 106 temporarily interrupts the printing operation by printer controller 2103 in step S205, and makes DC controller 2002 execute the requested copying operation of an original image in step S206. Reader controller 106 waits for the end of the copying operation in step S207. After the copying operation, reader controller 106 restarts the interrupted printing operation in step S201.

Here, the judgment of allowance/prohibition of the interruption copy is performed by referring a flag, such as the interruption copy allowance flag provided in an internal RAM of CPU 2209 in reader controller 106. The control relating to interruption copy allowance/prohibit will be explained later.

The second embodiment this invention will be explained by focusing to the difference between the first and second embodiment in density control method.

Figure 27:
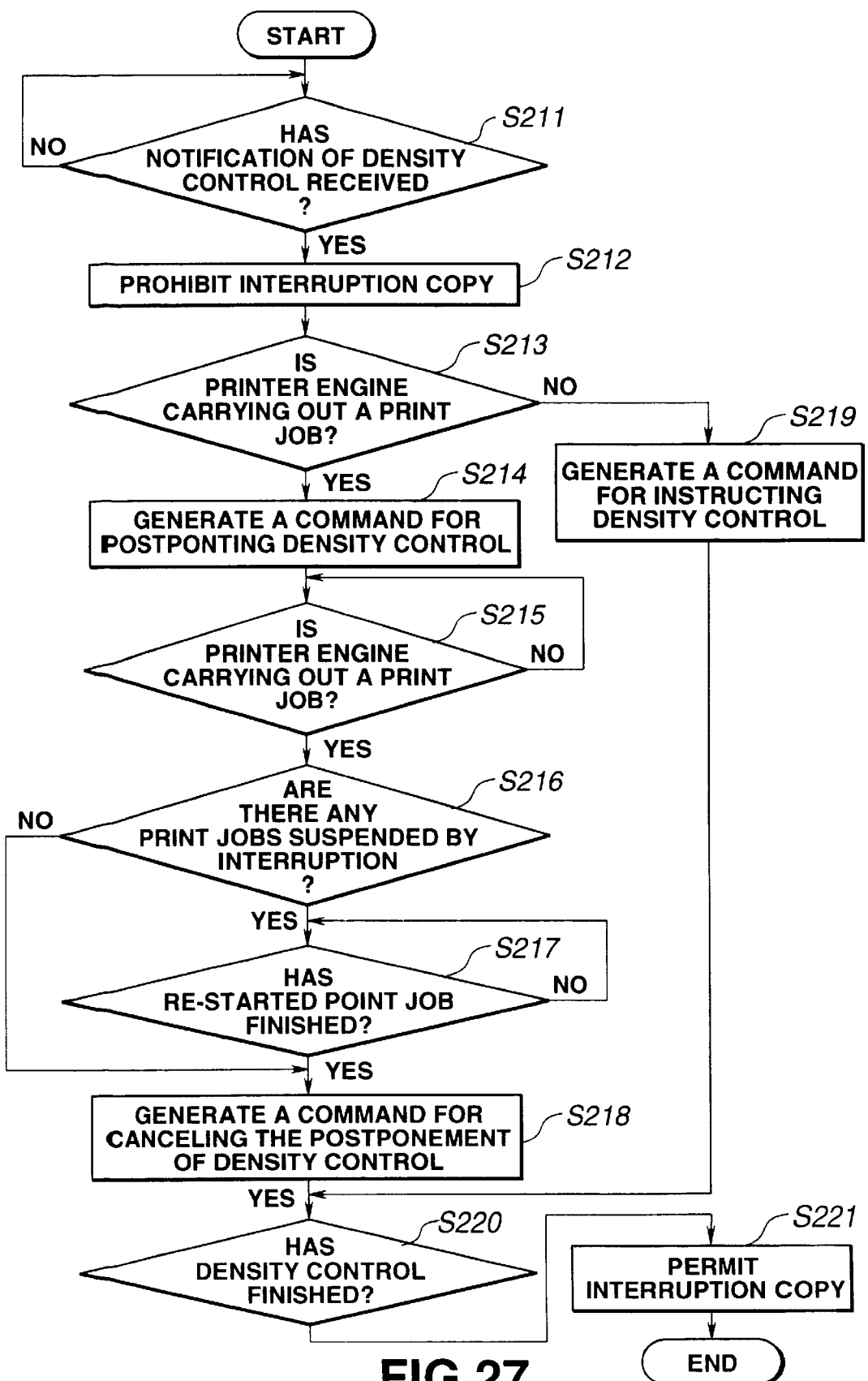
FIG. 27 explains another example of a control sequence of reader controller to which the necessity for density control is transmitted.

FIG. 27 explains the control sequence of reader controller 106, to which the necessity of the density control is transmitted in this embodiment.

In step S211, after receiving the notification of the density control and setting above mentioned interruption copy allowance flag to prohibited condition, reader controller 106 judges whether it is a suitable timing for executing the density control from the whole operating condition of printer apparatus 2001 when the notification is received. This is because it takes long time to execute the density control and it is not preferable to execute the density control during a sequence of print jobs as the color tones of the output images before and after the density control are different each other.

That is, in step S213, it is judged whether a print job is in progress, and if the print job is in progress, in step S214, a command for postponing the density control is generated. Further, if the print job is not in progress, in step S219, reader controller 106 generates a command for instructing the execution of the density control and goes to step S220.

In case the postponing of the density control is instructed, in step S215, printer controller 106 waits for the finish of the print job in progress. After finishing the print job, in step S 216, reader controller 106 judges whether there is any print job, which is interrupted by interruption copy. If there is any interrupted print job, in step S217, reader controller 106 restarts the interrupted print job and waits for the finish of the print job. After that, in step 218, reader controller 106 generates a command for releasing the postponing of the density control and goes to step S220.

Next, reader controller 106 waits for the finish of the density control in step S220.

The finish of the density control is judged by the status sent from DC controller 2002 in response to the command, to DC controller 2002, confirming the progress of the density control. After finishing the density control, reader controller 106 allows the interruption copy in step S221 and process ends.

According to the embodiment explained above, it is possible to adjust image forming conditions after finishing the print job which is going on, even if adjustment of the image forming condition of the image forming part, such as density adjustment, becomes necessary during the execution of the print job.

Also, if adjustment of the image forming condition of the image forming part becomes necessary in the image forming system, in which a plurality of different kind of print jobs are allowed to interrupt each other, it is possible to adjust image forming conditions at the proper timing and to avoid the situation that interruption jobs are generated one after another and adjustment the image forming condition is postponed indefinitely.

(Third Embodiment)

In the first and second embodiments, the density control sequences, as shown in FIGS. 24 and 27, are performed irrespective of the process condition of the interrupting job and interrupted job.

As discussed above, high quality color reproduction cannot be assured without the density control. However, it takes a long time to perform density control and the color tones of the output images before and after the density control might be different.

From the aspect of the color reproduction quality, it is preferable to perform the density control just after receiving the density control command. However, from the aspect of user's convenience, it is not usually preferable to do so.

Accordingly, in this embodiment, a controller judges the process condition of the job when the density control command is received. Based on this judgement, the controller decides whether the density control shown in FIG. 22 should be performed at once or the postpone processing of the density control, such as shown in FIG. 24 steps S193 to S197, is necessary.

Here, in this embodiment, the basic structure of the apparatus is the same as the first embodiment. Therefore, the same structure will not be explained to avoid redundancy.

Figure 28:
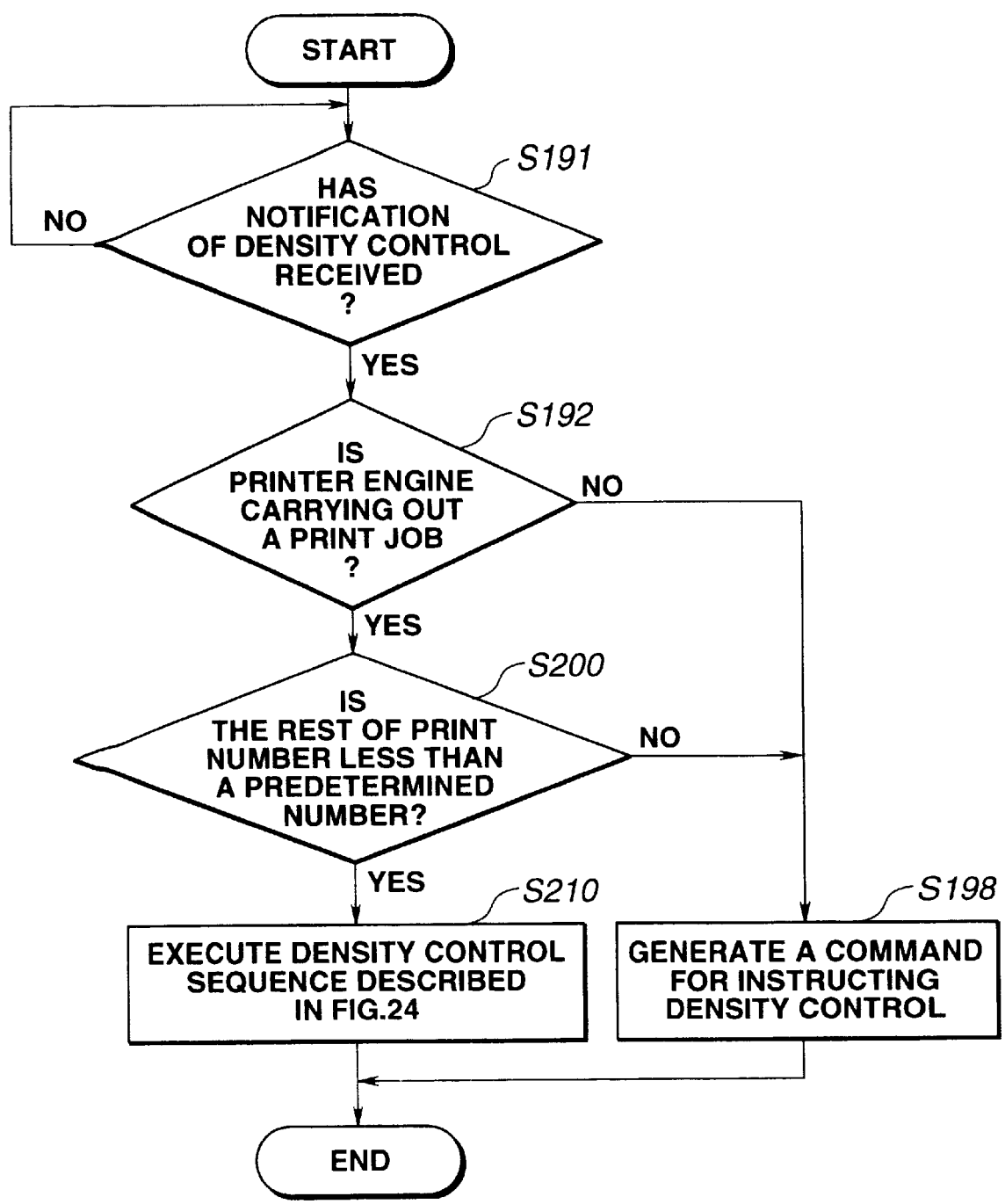
FIG. 28 explains another example of a control sequence of a reader controller to which the necessity for density control is transmitted.

FIG. 28 explains the density control sequence of the third embodiment. The steps which are the same as FIG. 24 are labeled by the same numbers.

Reader controller 106 receives the notification of the density control in step S191, and judges whether a print job is in progress or not in step S192, and in case no print job is in progress, generates a command for instructing the execution of the density control in step S198 and process ends.

In case a print job is in progress, reader controller 106 obtains the process condition of the print job in progress, or, if there are any interrupted jobs, the process condition of the interrupted print job in step S200. In this embodiment, the number of prints, which is scheduled to be printed in the future in the print job in progress or the interrupted print job, is calculated. It is judged whether the number of prints which will be printed in the future is less than a predetermined value such as 10 prints. The predetermined value is determined in accordance with the characteristic of the printer engine, especially the limit value which assures the color reproduction quality, at designing stage of the printer engine.

If the number of prints which will be printed in the future is less than the predetermined value in step S200, the process of the steps from S193 through S198 in FIG. 24 is performed in step S210.

If the number of prints which will be printed in the future is not less than the predetermined value in step S200, reader controller 106 generates a command for instructing the execution of the density control in step S198.

According to this embodiment, the execution timing of the density control can be controlled in accordance with the remaining number of printing. Therefore, while ensuring at least a minimum quality of color reproduction, it is possible to improve convenience for a user. That is, it is possible to prevent a user from being bothered by the density control.

In this embodiment, the remaining number of printing is examined in step S200. However, it is possible to use the number of images as is shown in step S161 of FIG. 21.

That is, another parameter can be used for determining the execution timing, if it corresponds to the load of the printer engine.

(Fourth Embodiment)

In the above embodiments, the density control command is generated based on the control sequence shown in FIG. 21.

According to the sequence, the judgment whether the density control command should be generated is performed based on the factors which correspond to the change after elapse of time or environmental change, such as accumulated number/accumulated image number (step S161), continuous still time (step S164) and environmental change (step S163).

Another factor, which makes it impossible to assure the color reproduction quality, is a factor of trouble, such as change of recording material or jam process.

Therefore, in this embodiment, in addition to a factor corresponding to change after elapse of time or environmental change, a factor of trouble is considered to generating the density control command. This kind of density control command is disclosed in U.S. patent application Ser. No. 08/989,683 filed on Dec. 12, 1997.

The purpose of this embodiment is to provide an apparatus, which maintains color reproduction quality and is convenient for a user, by using the density control sequence disclosed in the above application.

The factor corresponding to change after elapse of time or environmental change causes gradual deterioration of the color reproduction quality of the printer engine. On the other hand, a factor of trouble causes rapid deterioration of the color reproduction quality. Therefore, in this embodiment, in order to keep color reproduction quality and to improve convenience for a user, the density control timing is determined in accordance with a kind of the factor of characteristic change of the printer engine.

Figure 29:
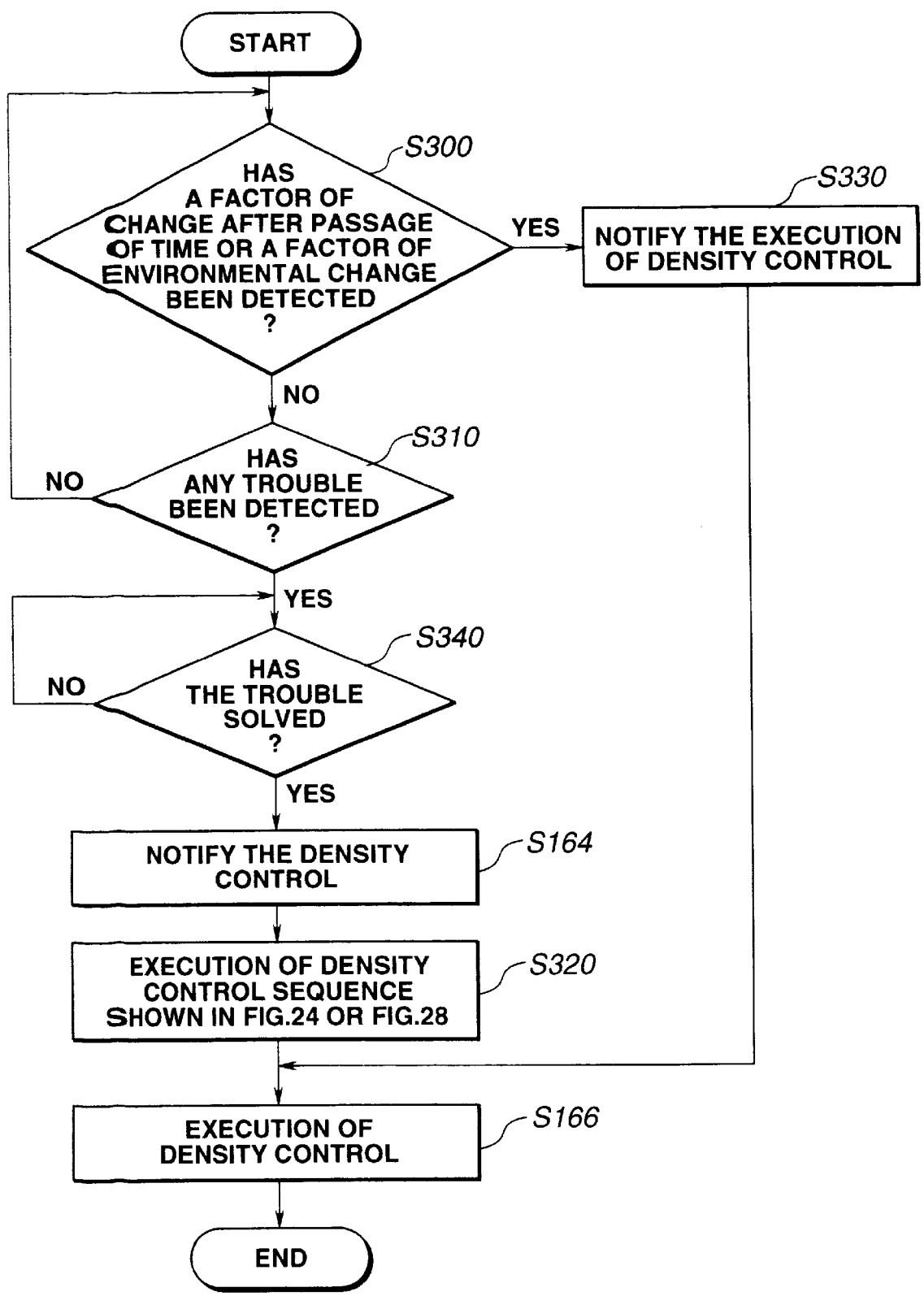
FIG. 29 shows another example of a control sequence relating to the judgement of necessity for and the execution of density control by a DC controller.

FIG. 29 explains a density control sequence of this embodiment. The steps which are the same as FIG. 24 are labeled by the same numbers.

In step S300, the process shown in steps S161 to S163 of FIG. 21 is performed and change after elapse of time or environmental change is detected.

In case the change after elapse of time or environmental change is detected in step S300, the density control is executed right after the detection. That is, in step S330, the execution of the density control is notifies to reader controller 106. Reader controller 106 prohibits a print job during the density control processing. In step S166, DC controller 2002 performs the density control processing shown in FIG. 22.

On the other hand, in case the change after elapse of time or environmental change is not detected in step S300, it is examined whether a trouble is detected or not in step S310. If no trouble is detected, DC controller 2002 returns to step S300. If a trouble is detected, DC controller 2002 waits until the trouble is solved and notifies the necessity of the density control to reader controller 106 as explained in step S164 of FIG. 21.

In step S320, according to the notification of the density control, DC controller 2002 performs a density control sequence shown in FIG. 24 or FIG. 28. In step S166, the density control is performed.

According to this embodiment, the timing of the density control is controlled based on a kind of factors, which causes the density control. Therefore, both color reproduction quality and convenience for a user can be achieved.

(Other Embodiment)

Modifications of the above embodiments are included in the scope of this invention.

The present invention can be applied to not only a system comprising a plurality of devices (for example, host computer, interface device, reader and printer), but also to a single device (for example, copying apparatus and facsimile apparatus).

The purpose of the present invention can be achieved by providing program codes of software for realizing the above mentioned function into a computer in the apparatus or the system connected to a various device, and making the computer (ex. CPU, MPU) in the apparatus or the system operate in accordance with the stored program, in order to realize the function of the above mentioned embodiment by using a device.

In this case, the program codes of said software themselves are used to realize the above mentioned function of the embodiment. The program codes themselves and means for supplying them to the computer, for example, the memory medium storing the program codes comprise the invention.

For example, floppy disks, hard disks, optical disks, opto-magnetic disks, CD-ROM, CD-R, magnetic tapes, non-volatile memory card, ROM can be used as the memory medium storing the program codes.

Needless to say, the above mentioned function of the embodiment can be realized not only by the computer which executes the supplied program codes but also by the computer which executes the supplied program codes together with the OS (operating system) operating the computer or other application software.

Further, the supplied program codes can be stored in the memory provided in a function extension board or a function extension unit connected to the computer, after that the CPU and so on, mounted on the function extension board or the function extension unit, may execute a part of or all of the processing based on the instruction of the program codes.

Figure 25:
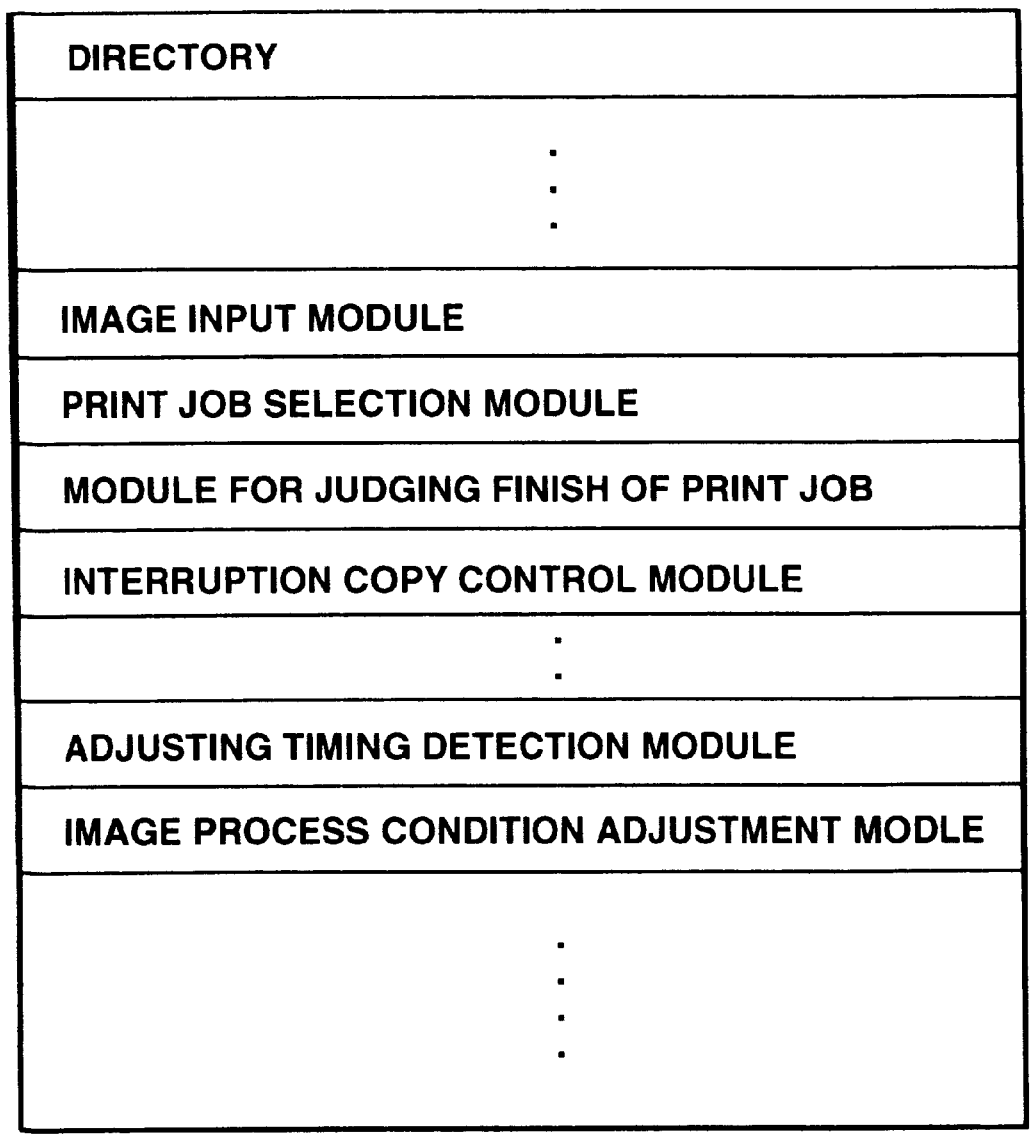
FIG. 25 shows an example of a memory map of memory medium storing the program codes according to the present invention.

In case the present invention is applied to above mentioned memory medium, the program codes corresponding to above mentioned flow-chart is stored to the memory medium. For example, program codes of each module of at least "detection of adjusting timing", "judgment of finishing print job" and "adjustment of image processing condition" can be stored in the memory medium, as shown in FIG. 25.

Further, the information, which concerns the necessity of the adjusting an image process condition, is not limited to "continuous still time in standby condition", "number of discharged recording paper", "number of images formed on intermediate transfer member", temperature and humidity. Another information, for example, the time after photosensitive drum change can be used. Also, an image processing condition to be adjusted is not limited to the above embodiment. For example, a color correction function (image data processing condition) or a laser power (image forming condition) can be adjusted.

Above explained "the image process job" includes a job which forms one print output and a job which forms a sequence of printing outputs.

As explained above, according to the present invention, it's possible to provide the image processing apparatus and method for avoiding the color tone change in a sequence of image processing job by the adjustment.

As a result, it is possible to realize the improved density adjusting process in consideration of a printing job.

While present invention is described above with respect to what is currently considered to be its preferred embodiments, it is to be understood that the invention is not limited to the disclosed embodiments. To the contrary, the invention is intended to cover various modifications and equivalent arrangements included within the spirit and scope of the appended claims.

What is claimed is:

1. An image processing apparatus comprising:
   reading means for reading an original and generating first image data;
   receiving means for receiving second image data from an external apparatus;
   process means for processing the first or the second image data for forming an image;
   judging means for judging the necessity of adjusting an image process condition of said process means; and
   adjusting means for adjusting the image processing condition based on the judgement result of said judging means,
   wherein in case the necessity of adjusting is judged during an image process job, said adjusting means restrains adjusting operation until the image process job is finished.

2. An image processing apparatus according to claim 1, wherein said process means processes image data and said image process condition is an image data process condition.

3. An image processing apparatus according to claim 1, wherein said process means forms an image on a medium and said image process condition is an image forming condition.

4. An image processing apparatus according to claim 1, wherein said image process condition relates to a density reproduction characteristic.

5. An image processing apparatus according to claim 1, wherein said image process condition relates to a color balance of a reproduced image.

6. An image processing apparatus according to claim 1, wherein in case the image process job is interrupted by another image process job, the adjusting operation is restrained until the another image process job is finished.

7. An image processing apparatus comprising:
   receiving means for receiving information concerning the necessity of adjusting an image process condition; and
   control means for controlling the adjustment of the image processing condition based on the information received by said receiving means;
   wherein in case the necessity of adjusting is judged during an image process job, said control means prohibits executing another image process job other than the image process job in progress before adjusting the image processing condition.

8. An image processing apparatus according to claim 7, wherein said information is obtained by reading a standard patch formed on a medium.

9. An image processing apparatus according to claim 7, wherein said information is sent from an external processor.

10. An image processing apparatus according to claim 7, wherein said image process condition relates to a density reproduction characteristic.

11. An image processing apparatus according to claim 7, wherein said image process condition relates to a color balance of a reproduced image.

12. An image processing method comprising the steps of:
    receiving step of receiving information concerning the necessity of adjusting an image process condition; and
    control step of controlling the adjustment of the image processing condition based on the received information in said receiving means,
    wherein in case the necessity of adjusting is judged during an image process job, the execution of another image process job other than the image process job in progress is prohibited before adjusting the image processing condition.

13. A computer-executable program product stored on a computer readable medium, the computer-executable program product for adjusting an image processing condition, said computer program product including;
    computer readable program code means to receive information concerning the necessity of adjusting an image process;
    computer readable program code means to control the adjustment of the image processing condition based on the received information in said receiving means,
    wherein in case the necessity of adjusting is judged during an image process job, the execution of another image process job other than the image process job in progress is prohibited before adjusting the image processing condition.

14. An image processing apparatus comprising:
    first receiving means for receiving information concerning the necessity of adjusting an image process condition of an image processing apparatus;
    second receiving means for receiving a plurality of image process job commands, at least one of which can interrupt another image process job command; and
    control means for controlling an image process sequence of the image processing apparatus, which includes adjusting operation of the image process condition and a plurality of image process jobs based on the image process job commands.

15. An image processing apparatus according to claim 14, wherein said information is obtained by reading a standard patch formed on a medium.

16. An image processing apparatus according to claim 14, wherein said information is sent from an external processor.

17. An image processing apparatus according to claim 14, wherein said image process condition relates to a density reproduction characteristic.

18. An image processing apparatus according to claim 14, wherein said image process condition relates to a color balance of a reproduced image.

19. An image processing apparatus according to claim 14, wherein said plurality of image processing job commands are sent from at least two independent processors.

20. An image processing method comprising the steps of:
    first receiving step of receiving information concerning the necessity of adjusting an image process condition of an image processing apparatus;
    second receiving step of receiving a plurality of image process job commands, at least one of which can interrupt another image process job command; and
    control step of controlling an image process sequence of the image processing apparatus, which includes adjusting operation of the image process condition and a plurality of image process jobs based on the image process job commands.

21. A computer-executable program product stored on a computer readable medium, the computer-executable program product for adjusting an image processing condition, said computer program product including:
    a computer usable medium having computer readable program code means embodied in said medium for adjusting an image processing condition, said computer program product including;
    computer readable program code means for receiving information concerning the necessity of adjusting an image process condition of an image processing apparatus;

computer readable program code means for receiving a plurality of image process job commands, at least one of which can interrupt another image process job command; and computer readable program code means for controlling an image process sequence of the image processing apparatus, which includes adjusting operation of the image process condition and a plurality of image process jobs based on the image process job commands.

22. An image processing apparatus comprising:

receiving means for receiving information concerning the necessity of adjusting an image process condition of an image processing apparatus;

monitoring means for monitoring a proceeding of an image process job; and control means for controlling the adjustment of the image processing condition based on the information received by said receiving means and the proceeding of the image process job.

23. An image processing apparatus according to claim 22, wherein said information is obtained by reading a standard patch formed on a medium.

24. An image processing apparatus according to claim 22, wherein said information is sent from an external processor.

25. An image processing apparatus according to claim 22, wherein said image process condition relates to a density reproduction characteristic.

26. An image processing apparatus according to claim 22, wherein said image process condition relates to a color balance of a reproduced image.

27. An image processing apparatus according to claim 22, wherein said proceeding of the image process job is the number of the reproduced images.

28. An image processing apparatus according to claim 22, wherein said control means controls the adjustment timing of the image processing condition based on the kind of the factors which cause adjustment of the image process condition.

29. An image processing method comprising the steps of:

receiving step of receiving information concerning the necessity of adjusting an image process condition of an image processing apparatus;

monitoring step of monitoring a proceeding of an image process job; and control step of controlling the adjustment of the image processing condition based on the information received by said receiving means and the proceeding of the image process job.

30. A computer-executable program product stored on a computer readable medium, the computer-executable program product for adjusting an image processing condition, said computer program product including;

a computer usable medium having computer readable program code means embodied in said medium for adjusting an image processing condition, said computer program product including;

computer readable program code means for receiving information concerning the necessity of adjusting an image process condition of an image processing apparatus;

computer readable program code means for monitoring a proceeding of an image process job; and computer readable program code means for controlling the adjustment of the image processing condition based on the information received by said receiving means and the proceeding of the image process job.

* * * * *

UNITED STATES PATENT AND TRADEMARK OFFICE
CERTIFICATE OF CORRECTION

PATENT NO. : 6,384,934 B1
DATED : May 7, 2002
INVENTOR(S) : Hideto Kohtani et al.

It is certified that error appears in the above-identified patent and that said Letters Patent is hereby corrected as shown below:

Drawings,
Figure 21, "ACCUMURATED" (both occurrences) should read -- ACCUMULATED --;
Figure 24, "POINT JOB" should read -- PRINT JOB --; and
Figure 27, "POINT JOB" should read -- PRINT JOB --.

Column 1,
Line 18, "printer" should read -- printers --;
Line 25, "different" should read -- different from --; and
Line 30, "different" should read -- different from --.

Column 2,
Line 30, "followed" should read -- following --; and
Line 64, "structure" should read -- the structure --.

Column 3,
Line 2, "structure" should read -- the structure --.

Column 4,
Line 4, "each" should read -- to each --;
Line 61, "of" should be deleted; and
Line 64, "above mentioned" should read -- above-mentioned --.

Column 5,
Line 30, "device(not" should read -- device (not --,
Line 35, "above mentioned" should read -- above-mentioned --.

Column 7,
Line 12, "is." should read -- is --;
Line 16, "the.timing" should read -- the timing --;
Line 31, "above mentioned" should read -- above-mentioned --; and
Line 57, "of" (second occurrence) should be deleted.

Column 12,
Line 51, "can not" should read -- cannot --; and
Line 66, "can not" should read -- cannot --.

UNITED STATES PATENT AND TRADEMARK OFFICE
CERTIFICATE OF CORRECTION

PATENT NO. : 6,384,934 B1
DATED : May 7, 2002
INVENTOR(S) : Hideto Kohtani et al.

It is certified that error appears in the above-identified patent and that said Letters Patent is hereby corrected as shown below:

Column 13,
Line 44, "can not" should read -- cannot --.

Column 14,
Line 60, "different" should read -- different from --; and
Line 67, "on going" should read -- ongoing --.

Column 15,
Line 34, "ltiming" should read -- timing --;
Line 46, "realize" should read -- realizes --;
Line 53, "indicates" should read -- indicate --; and
Line 63, "can not" should read -- cannot --.

Column 16,
Line 67, "unbalance" should read -- imbalance --.

Column 17,
Line 3, "faccu" should read -- accu --;
Line 40, "different" should read -- different from --,
Line 49, "finish" should read -- finish of --; and
Line 62, "is" (second occurrence) should be deleted.

Column 18,
Figure 29, "above mentioned" should read -- above-mentioned --; and
Figure 52, "can not" should read -- cannot --.

Column 19,
Line 23, "above mentioned" should read -- above-mentioned --.

Column 20,
Line 1, "adjustment" should read -- adjustment of --; and
Line 20, "the" should read -- to --.

UNITED STATES PATENT AND TRADEMARK OFFICE
CERTIFICATE OF CORRECTION

PATENT NO. : 6,384,934 B1
DATED : May 7, 2002
INVENTOR(S) : Hideto Kohtani et al.

It is certified that error appears in the above-identified patent and that said Letters Patent is hereby corrected as shown below:

Column 21,
Line 42, "notifies" should read -- notified --.

Column 22,
Figure 5, "above" should read -- above- --;
Figure 10, "above mentioned" should read -- above-mentioned --;
Figure 13, "above mentioned" should read -- above-mentioned --;
Figure 22, "above mentioned" should read -- above-mentioned --;
Figure 34, "above men-" should read -- above-men- --;
Figure 36, "above mentioned" should read -- above-mentioned --; and
Figure 56, "it's" should read -- it is --.

Signed and Sealed this

Fourteenth Day of January, 2003

JAMES E. ROGAN
*Director of the United States Patent and Trademark Office*